US009079188B2

(12) United States Patent
Culver

(10) Patent No.: US 9,079,188 B2
(45) Date of Patent: Jul. 14, 2015

(54) SYSTEM AND METHOD FOR SEPARATING DRILL CUTTINGS FROM DRILLING FLUIDS

(71) Applicant: Judah Industries, Inc., Abilene, TX (US)

(72) Inventor: Terry Gordon Culver, Weatherford, TX (US)

(73) Assignee: Flowback Fluids LLC, Bedford, TX (US)

( * ) Notice: Subject to any disclaimer, the term of this patent is extended or adjusted under 35 U.S.C. 154(b) by 278 days.

(21) Appl. No.: 13/669,440

(22) Filed: Nov. 5, 2012

(65) Prior Publication Data

US 2013/0112598 A1 May 9, 2013

Related U.S. Application Data

(60) Provisional application No. 61/628,705, filed on Nov. 4, 2011.

(51) Int. Cl.
| *B03B 9/00* | (2006.01) |
| *B03B 7/00* | (2006.01) |
| *E21B 21/01* | (2006.01) |
| *E21B 21/06* | (2006.01) |
| *E21C 41/30* | (2006.01) |
| *B01D 21/26* | (2006.01) |

(52) U.S. Cl.
CPC . *B03B 7/00* (2013.01); *E21B 21/01* (2013.01); *E21B 21/066* (2013.01); *E21C 41/30* (2013.01); *B01D 21/267* (2013.01)

(58) Field of Classification Search
CPC ............ B03B 9/00; B03B 9/005; B07C 5/36; B07B 13/04
USPC ........ 209/3, 10, 552, 659, 660, 240, 241, 268
See application file for complete search history.

(56) References Cited

U.S. PATENT DOCUMENTS

| 4,480,702 A   * | 11/1984 | Kelly, Jr. .......................... 175/66 |
| 2002/0074269 A1 * | 6/2002 | Hensley et al. ............... 209/726 |
| 2005/0236015 A1 * | 10/2005 | Goel et al. ..................... 134/10 |
| 2006/0081503 A1 * | 4/2006 | Wegner .......................... 209/17 |
| 2012/0267287 A1 * | 10/2012 | Bailey ............................. 209/10 |

* cited by examiner

*Primary Examiner* — Terrell Matthews
(74) *Attorney, Agent, or Firm* — Gardere Wynne Sewell LLP; Robert J. Ward

(57) ABSTRACT

A system and method for separating two or more materials, such as a solid from a liquid, or a solid from a slurry, are provided. An exemplary system and method for separating drill cuttings from drilling fluids are provided, as well as a system and method of processing such separated drill cuttings. In another implementation, a system and method is provided for separating gold (or another mineral, element, or solid) from a slurry or liquid that includes mining cuttings.

39 Claims, 17 Drawing Sheets

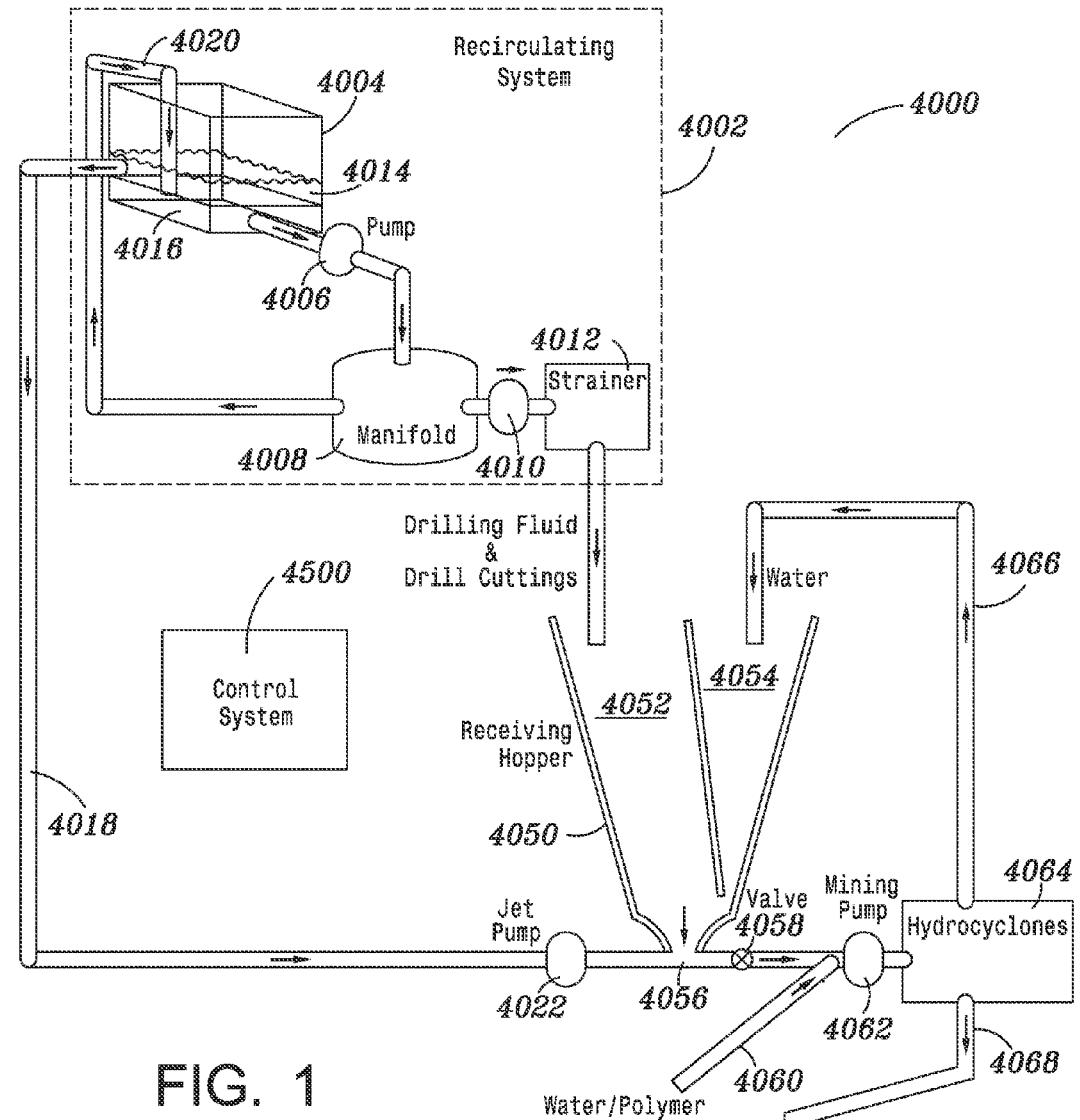
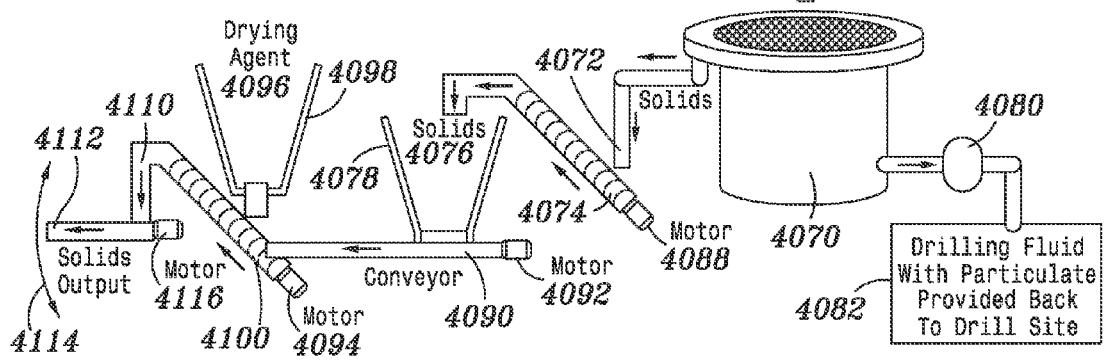
FIG. 1

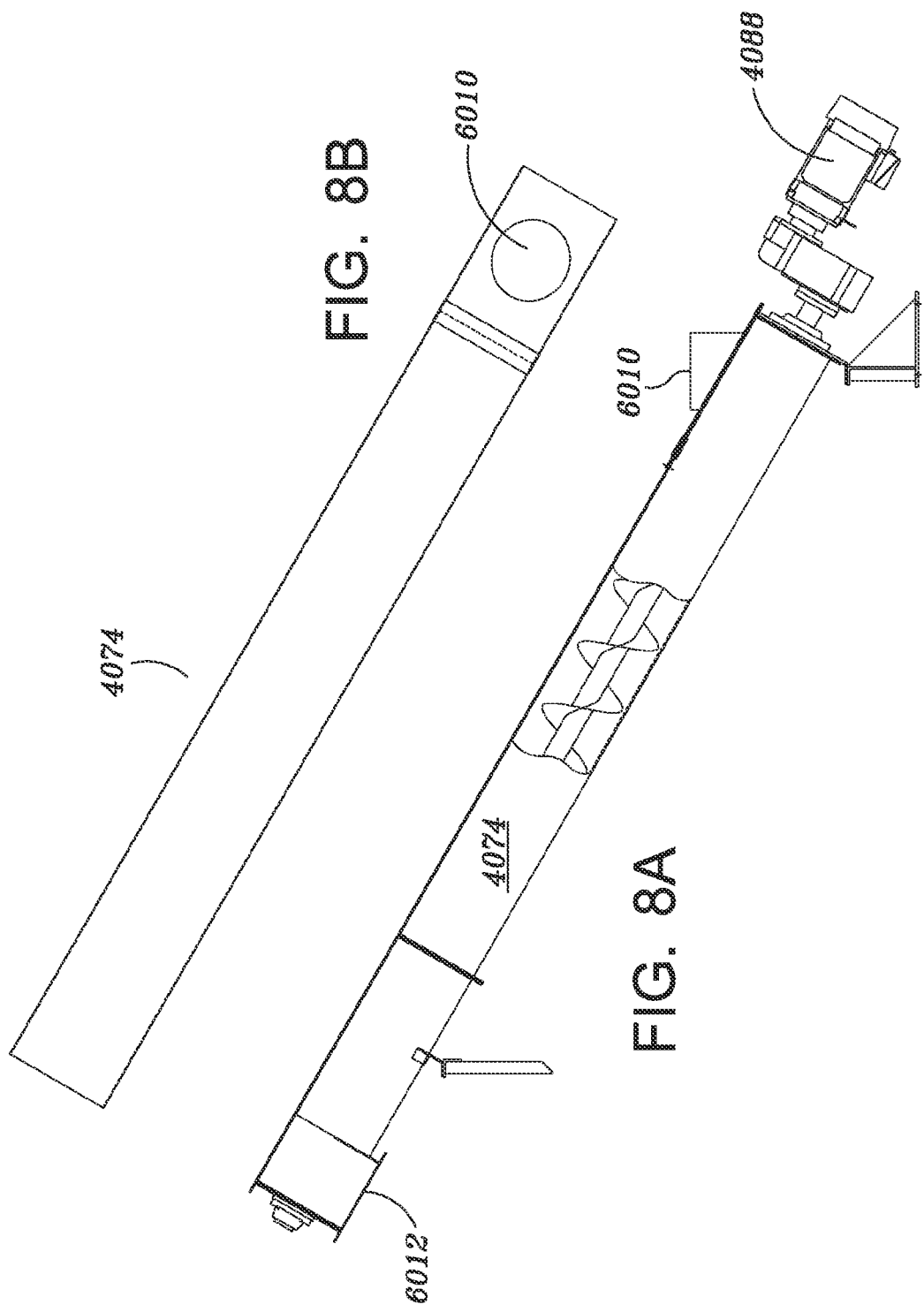

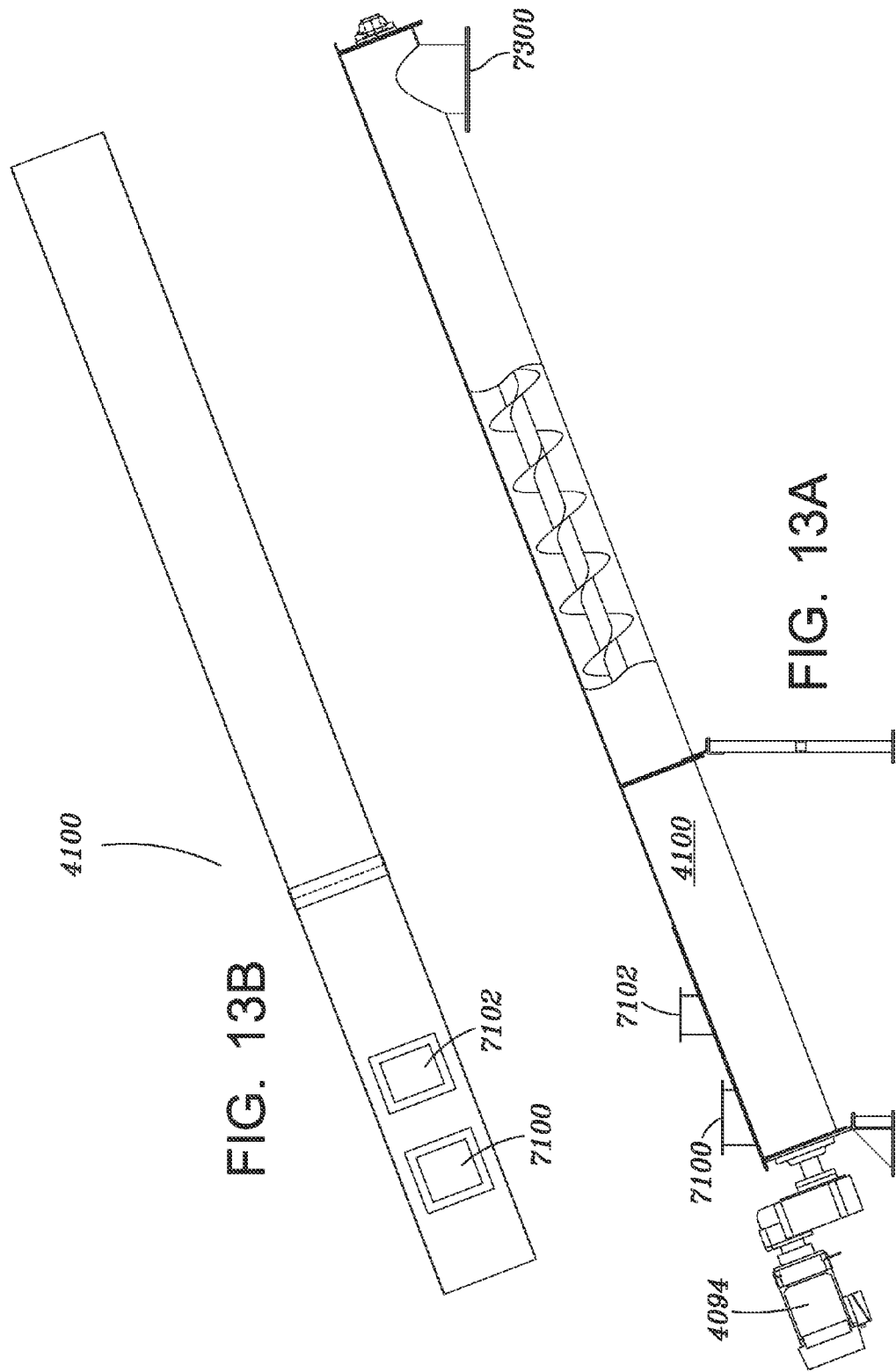

SYSTEM AND METHOD FOR SEPARATING DRILL CUTTINGS FROM DRILLING FLUIDS

CROSS-REFERENCE TO RELATED APPLICATIONS

Pursuant to 35 U.S.C. §119 (e), this application claims priority from, and hereby incorporates by reference for oil purposes, U.S. Provisional Patent Application Ser. No. 61/628,705, entitled System and Method for Separating Drill Cuttings From Drilling Fluids, naming Terry Gordon Culver as inventor, and filed Nov. 4, 2011.

TECHNICAL FIELD

The present invention relates generally to the field of separating or processing systems and methods, and more particularly, but not by way of limitation, to a system and method for separating two or more materials, such as a solid from a liquid or slurry, which may include, for example, separating drill cuttings from drilling fluids (or drilling muds) and processing the same, or separating gold (or other minerals or elements) from a slurry that includes mining cuttings.

BACKGROUND

When drilling boreholes, such as when drilling an oil, gas or water well, drilling fluids are commonly used. Drilling fluids, which are also referred to as drilling muds (hereinafter collectively "drilling fluids"), may provide one or more functions during the drilling process such as, for example, to provide lubrication to the drill bit, to provide pressure in the well bore, and to provide a transport mechanism to remove drill cuttings that are produced by the drilling of the borehole.

Drilling fluids are expensive and closely monitored and analyzed during the drilling process to ensure that the chemical and physical characteristics of the drilling fluids are maintained at desired levels during the drilling process. The desired characteristics may change at different depths of the borehole and as geographic formations vary along the borehole. Drilling fluids are often recycled and reused because of their significant cost.

Drilling fluids may contain hazardous or dangerous chemicals, such as petroleum, based drilling fluids. As such, the use, disposal, handling and recycling of drilling fluids present significant environmental concerns.

As drilling fluids exit the borehole during the drilling process, they contain drill cuttings, which include the rocks, sands, materials, dirt, and the like that were removed to create the borehole. As such, the drill cuttings are coated and mixed with the drilling fluids. This may present significant environmental issues when attempting to separate the drill cuttings from the drilling fluids so that the drilling fluids can be recycled and reused, or so that the drill cuttings can be safely disposed.

The separation of gold (or other minerals or elements) from slurries during certain mining processes also presents technical, environmental and economic concerns.

SUMMARY

A system and method for separating drill cuttings front drilling fluids (also known as drilling muds) are provided. In certain embodiments, this system and method may be used to separate two or more materials, such as a solid from a liquid, or a solid from a slurry, such as, for example, separating gold (or other minerals or elements) from a slurry that may include other rocks or minerals included in mining cuttings or drill cuttings.

The various embodiments and implementations of the embodiments described herein may provide a profusion of potential technical advantages and benefits. Other technical advantages may be readily apparent to one skilled in the art after review of the following figures, description and claims associated herewith.

BRIEF DESCRIPTION OF THE DRAWINGS

For a more complete understanding of the present disclosure and the advantages thereof; reference is now made to the following brief description, taken in connection with, the accompanying drawings and detailed description, wherein like reference numerals represent like parts, in which:

FIG. 1 is an overview diagram of a system for separating drill cuttings from drilling fluids, and processing the separated drill cuttings according to one implementation that includes a recirculating system;

FIGS. 8A-8B is a side-view, line drawing that illustrates an angled conveyor as a screw conveyor according to one embodiment;

FIGS. 13A-13B is a side-view, line drawing that illustrates a mixing conveyor as a screw conveyor according to one embodiment;

FIG. 15 is a line drawing that illustrates a side view of the gantry system, according to one implementation;

FIG. 16 is a simplified line drawing that illustrates an opposite side view of the gantry system of FIG. 15 showing various structural elements that demonstrate the operation of the gantry system;

FIG. 17 is a line drawing that illustrates a back view of the gantry system that will reside above a storage tank, such as a half-round storage tank, with an assembly operable to connect to a pump or receiving pipe that is shown to be movable in an upward and downward direction, as well as a left and right direction, as indicated by the arrows of FIG. 17;

FIG. 18 is a line drawing that illustrates a front view of one implementation of the gantry system that is opposite the view of FIG. 17, and that includes pulleys and certain levers (not necessarily shown in other FIGURES) so that the three dimensional movement of the gantry system may be controlled, at one location along the left side of FIG. 18, with the two-dimensions of movement visible in FIG. 18 indicated by the up and down arrows, and the left and right arrows;

FIG. 19 is a line drawing that illustrates a side view of the gantry system, like that of FIG. 16, in operation and positioned above a storage tank and operable to move left and right using chain or linkage driven, rollers along upper edges of the storage tank;

FIG. 20 is a line drawing that illustrates a front view of the gantry system, like that of FIG. 18, in operation and positioned above a storage tank and operable to move in three dimensions to position either a pump or receiving pipe in the storage tank, and that, in this embodiment, may be operated by one person positioned along the left side of the gantry system as shown in this FIG. 20.

DETAILED DESCRIPTION

It should be understood at the outset that although an exemplary implementation of the present invention is illustrated below, the present invention may be implemented, using any number of techniques, whether currently known or in existence. The present invention should in no way be limited to the exemplary implementations, illustrations, designs, drawings, and techniques shown and described herein. Additionally, the drawings and illustrations contained herein are not necessarily drawn to scale.

FIG. 1 is an overview diagram, of a system 4000 for separating drill cuttings from drilling fluids, and processing the separated drill cuttings according to one implementation. The implementation of FIG. 1 includes a recirculating system 4002 that may be used to preprocess and recirculate input material 4016, which includes at least the drill cuttings and the drilling fluids, prior to being received at a receiving hopper 4050 of the system 4000.

In other embodiments, the system 4000 may be used, to separate two or more materials, such as a solid from, a liquid or a slurry, which may include, for example, separating not only drill cuttings from drilling fluids, but also separating elements, minerals or solids, such as gold or other precious metals or minerals, from a slurry that includes mining cuttings.

The system 4000, as illustrated in FIG. 1, includes a recirculating system 4002 that may be used in certain embodiments to preprocess and/or recirculate the input material 4016, which in this embodiment would include the drill cuttings and drilling fluids. The drilling fluids may also be referred to as drilling muds. Although this application will primarily be described using an implementation for separating drill cuttings from drilling fluids, it should be understood that this system should not be so limited, and may be used for separating or processing two or more materials so that the desired solids may be separated from a liquid or a slurry.

The recirculating system 4002 includes a storage container 4003, which may be provided in one embodiment as a half-round storage container, for storing drill cuttings and drilling fluids as well as a liquid 4014 (which in one embodiment may be a liquid from the drilling fluids or, in another embodiment, a separate liquid), a pump 4006 operable to receive and pump a slurry or stream of the input material 4016, which may include the combination of drill cuttings and drilling fluids, that may reside at or towards the bottom of the storage container 4004. The liquid 4014, which in one embodiment includes water, normally resides above the input material 4016, or, in another embodiment, may be considered part of the input material.

Figure 19:
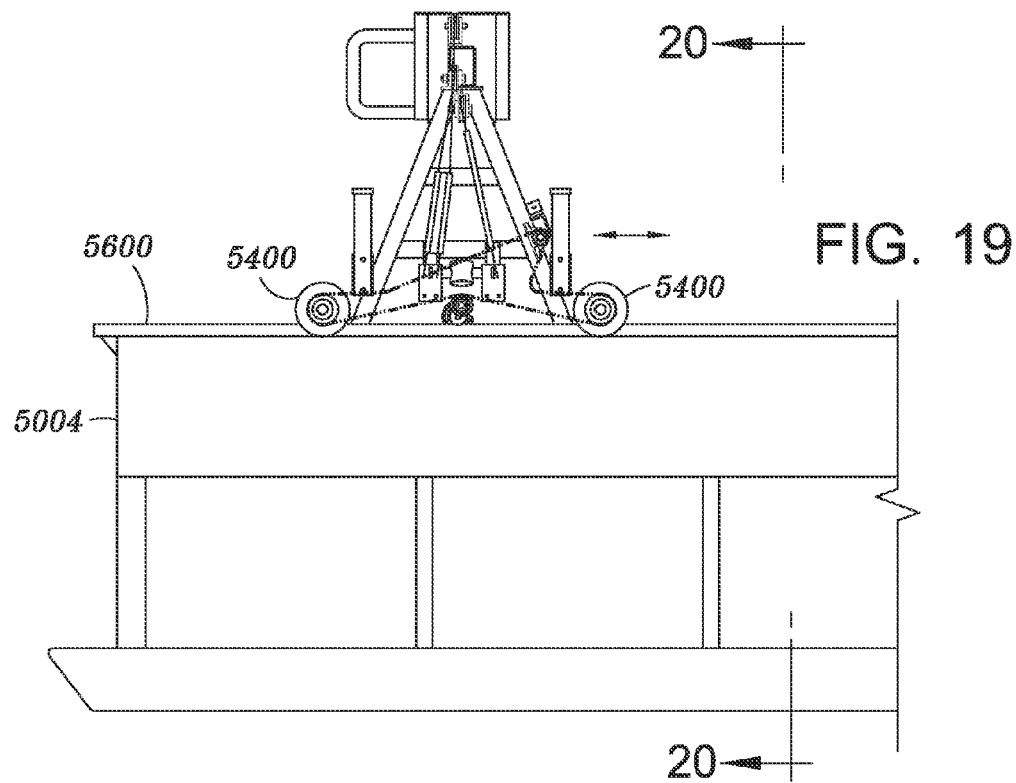
Figure 20:
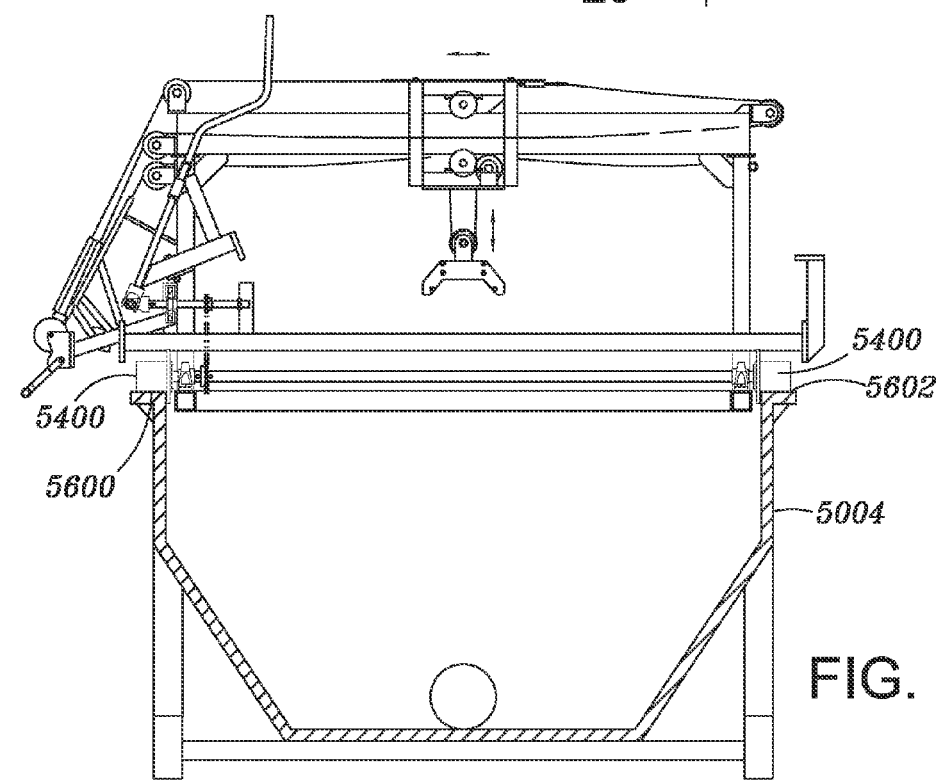

The storage container 4004 maybe as shown as the storage container 5004 in FIGS. 19 and 20 with the gantry system positioned above the half-round 5004, but may be implemented using any known or available storage tank. The top surface of the level of the liquid 4014 is shown within the storage container 4004. Because the level of the input material 4016 and the liquid 4014 will rise, fail and vary, the implementation of devices and mechanisms to remove such materials is a challenge.

For example, the need to access, remove and use the liquid 4014 of the storage container 4004 may be advantageous, such as through the pipe 4018, as shown in FIG. 1, to other locations of the system 4000, which will be described more fully below according to one implementation. In one embodiment, the liquid 4014 may be accessed as the liquid level rises and fails in the half-round implementation of the storage container 4004 using a float provided at or adjacent the liquid 4014 that is positioned either on or adjacent a pipe, tube or opening used to contact and receive the liquid 4014. The float allows the pipe, tube or opening to be positioned, as needed as the level of the liquid 4014 changes. In one embodiment, a structural member is hingably attached to or adjacent the storage tank or container 4004 and a float is used to allow the other end of the structural member to rise and fall as the level of the liquid 4014 changes. This positions the opening of the pipe, tube or other opening in the liquid. Such an arrangement allows the regaining portion of the float mechanism, such as that shown in FIG. 21, to angle downwardly to the surface of the liquid 4014, the level of which may rise and fall. The float may be any floatation volume, such as cylindrically shaped STYROFOAM or poly foam members that may be provided, around or connected, to one or member of the float mechanism. Referring again, to FIG. 21, the pipe in the center may connect (or be in liquid communication with) the pipe 4018 of the recirculating system 4002 of FIG. 1 so that the liquid 4014 may be accessed and provided to the system 4000 as needed, and as described more fully below, even when the levels of the liquid 4014 rise and fall. Other mechanisms may be implemented to provide such a desired function.

The recirculating system 4002 may, in one embodiment, include a manifold 4008 for receiving the input material 4016 and providing such input material 4016 to an output port through a suction pressure that may be provided downstream from a pump 4010. The manifold 4008 of the recirculating system 4002, in one implementation, may further include a recirculating output that may provide the input material 4016 (which also may include the liquid 4014) back to the storage container 4004 through a recirculating pipe 4020. This allows the input material 4016 to flow and recirculate until and when the system 4000 requires or demands additional input material 4016 for processing. The input material 4016 provided from the manifold 4008 at the output port is provided, in the implementation of FIG. 1, to a strainer 4012 through the pump 4010. The strainer 4012 may be implemented in any of a variety of configurations to remove larger solids (or solids of a desired size or range) from the input material 4016 before such larger solids are provided to the receiving hopper 4050 of the system 4000.

In one embodiment, the strainer 4012 may be implemented as a double or multi-basket strainer to provide the capability to allow the system 4000 to continue to operate while one or more of the baskets of the strainer 4012 is taken off-line and cleaned or unclogged, if needed, while the recirculating system 4002 and system 4000 continues to operate.

Figure 4:
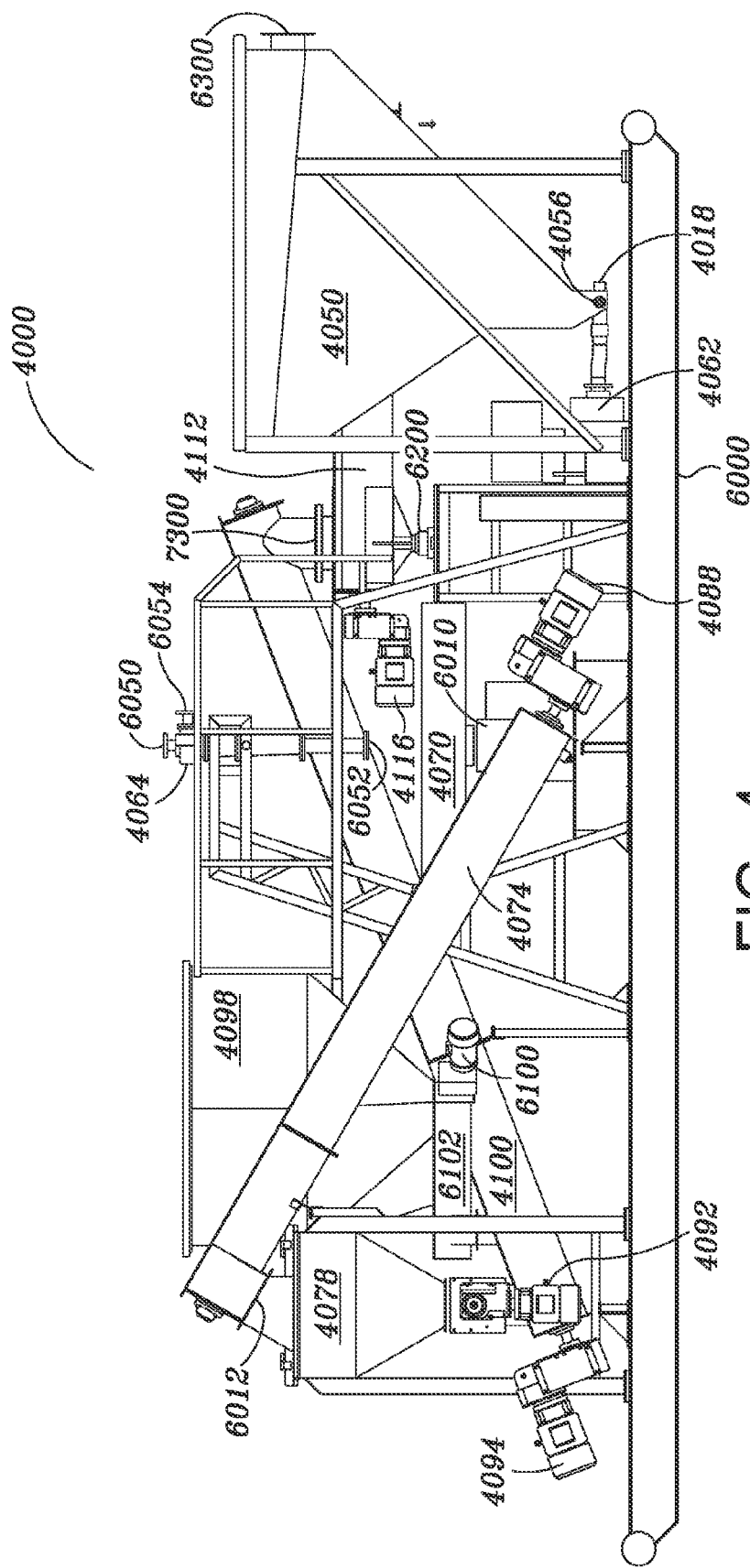
FIG. 4 is a side-view, line drawing that illustrates a general arrangement of one embodiment of certain components of the system for separating drill cuttings from, drilling fluids that is arranged and provided on a skid for ease of transportation on readily available commercial trailers for hauling cargo over highways.
Figure 5:
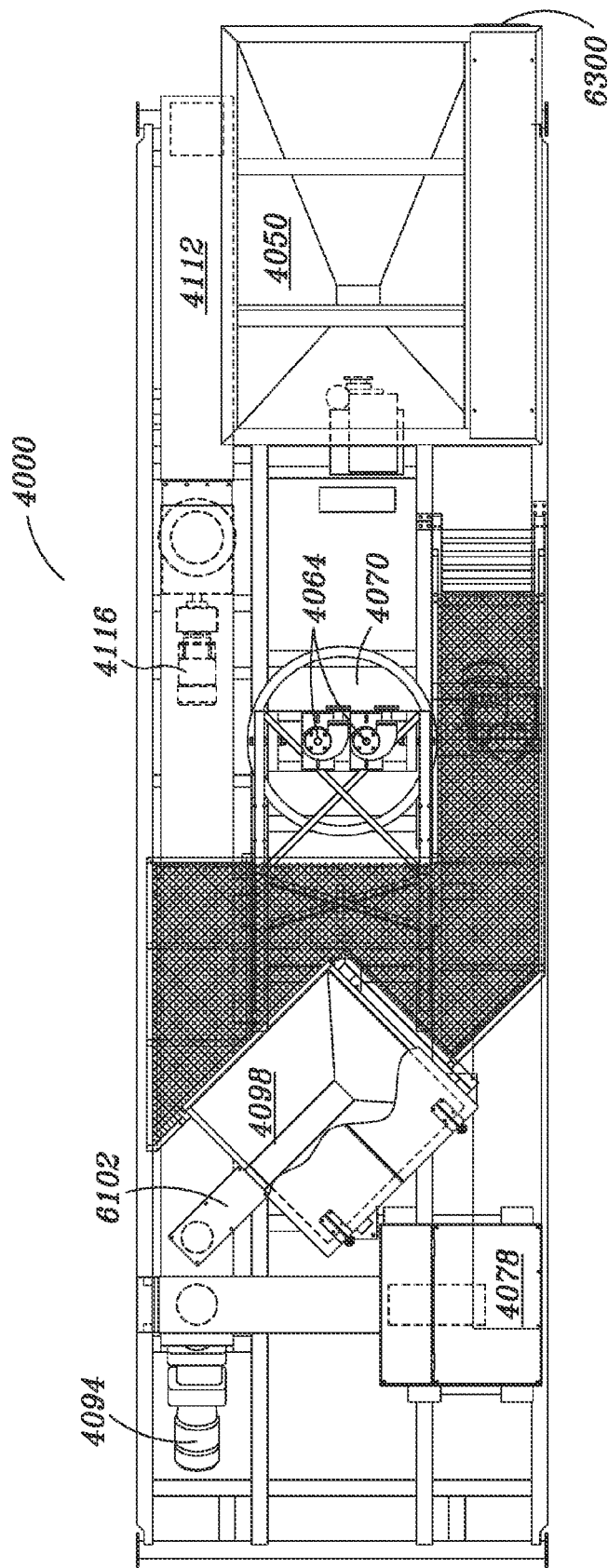
FIG. 5 is a top-view, line drawing of the system of FIG. 4 that illustrates an implementation of the system and certain components for separating drill cuttings from drilling fluids, and processing the separated drill, cuttings.

In one implementation, the majority of the individual elements or functions of the system 4000, other than the storage container 4004, may be implemented in one embodiment on a skid or platform for ease of operation, transportation and portability. An example skid or platform for the system is illustrated in FIGS. 4 and 5, and such system may be transported on a conventional flat bed trailer pulled by a semi-trailer truck, which may include an 18-wheeler truck. FIG. 4, which is discussed more fully below, provides a side view of the system 4000 for separating drill cuttings from drilling fluids according to one implementation in which a receiving hopper 4050 and various other components are illustrated. For example, the system may include the receiving hopper 4050, including an angled conveyor 4074 and a solids hopper 4078.

The various components, motors, detectors, assemblies, sub-systems and items of the system 4000 may be controlled, in one implementation through the use of a control system 4500, which is represented by the block 4500 in FIG. 1. In a preferred embodiment, all or a portion of the components, motors, pumps, and other devices of the system 4000 are controlled through the use of the control system 4500 using various Programmable Logic Controllers (PLCs) that are used to control the operation of the various motors, pumps, detectors, and components of the system 4000 as desired.

In certain embodiments, the various transducers and detectors of the system 4000, which may be thought of or considered as part of the control system 4500, provide signaling for the operation of the system 4000. For example, a transducer or level detector, such as an ultrasonic transducer, may be used to detect the level of the solids in the solids hopper 4078. When the solids reach a designated level as determined by the ultrasonic transducer, a motor, such as a motor 4092, may be started to move a solids conveyor 4090, such as an auger or screw conveyor, to move the solids 4076 out of the solids hopper 4078 to a location where the solids can be mixed with a drying agent 4096, which may be stored in a drying agent hopper 4098, in one implementation.

The system 4000, in one implementation, may use an infrared detector to signal the release of the drying agent 4096 from the drying agent hopper 4098 to be mixed with the solids 4076 released from the solids hopper 4078 and moved or transported by the solids conveyor 4090 using the solids conveyor motor 4092. The infrared detector may determine the presence of solids on the solids conveyor 4090 at a designated location and signal or control the release of the drying agent 4096 from the drying agent hopper 4098, in response, to be mixed with the solids.

Thus, the control system 4500, preferably using multiple PLCs, will be used to provide various controls throughout the system 4000. The control system 4500, in a preferred embodiment, includes a control cabinet to house the majority of the PLCs that is positioned above the transportable skid at the back end opposite the receiving hopper 4050. The control system 4500, in the implementation using a transportable skid, may be mounted on or using a suspension system, such as springs, shocks, and/or dampening members. The control cabinet, in one implementation, is mounted in relation to the skid using a suspension so that the control system 4500 is somewhat isolated from the vibration incurred during transportation of the system 4000 or during operation of the system 4000, thus increasing overall reliability and reducing the likelihood of vibratory damage to the control system 4500.

Referring again to the overview diagram of the system 4000 of FIG. 1, the remainder of the system is described beginning with the input material 4016, which may be received directly from the storage container 4004 or through the recirculating system 4002 (which may also be considered a pre-processing system that may or may not include recirculating the input material 4016) in certain implementations. As a reminder, the input material 4016 is described in this implementation as the combination of drill cuttings and drilling fluids, but may include, in other implementations, slurries of cuttings, such as mining cuttings, that include minerals, precious metals or other elements or solids to be separated. The drilling fluids, also sometimes referred to as drilling muds, may include water, water based chemicals, petroleum based chemicals, and any number of other chemicals, such as soaps and/or surfactants.

The input material 4016 is received from the recirculating system 4002 at the receiving hopper 4050. The receiving hopper 4050 may include one or more volumes to assist with receiving and mixing the input material to create a flowable and/or pumpable slurry. For example, the receiving hopper 4050 includes a first volume 4052 where the input material 4016 is received. The first volume 4052 connects with a receiving hopper output 4056 at the bottom of the receiving hopper 4050. A second volume 4054 of the receiving hopper 4050 may be provided to receive a transport liquid, which preferably will include water. In certain implementations, the transport liquid is a liquid from the input material, such as water. The second volume 4054 connects with (or is in fluid communication with) the receiving hopper output 4056 at the bottom of the receiving hopper 4050, where the transport liquid may contact and/or mix with the input material provided in the first volume 4052. The transport liquid may be provided from any desired source, and is shown in FIG. 1 being received front a separator, such as dual hydrocyclones 4064, where water may be provided. In other embodiments, the transport fluid may not be mixed with the input material until, after (or as) the input material exits the output of the receiving hopper 4050.

Figure 6A:
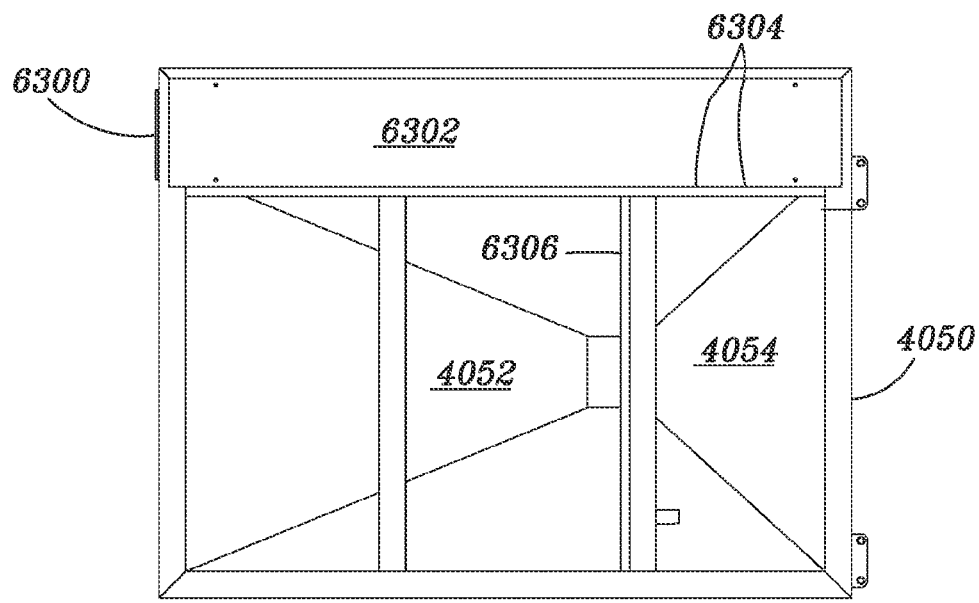
FIG. 6A is a top-view, line drawing of one embodiment of a receiving hopper that may be implemented in one embodiment.
Figure 6B:
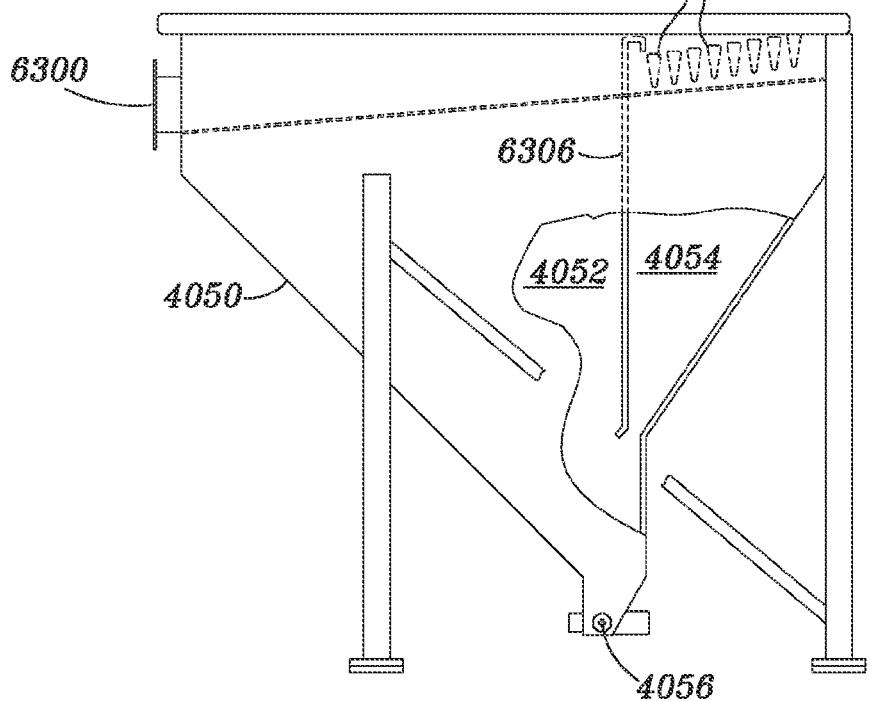
FIG. 6B is a side-view, line drawing of the receiving hopper of FIG. 6A.

In one implementation, the receiving hopper 4050 may be implemented as shown FIGS. 6A and 6B. A top view of the receiving hopper 4050 may include a weir or overflow channel in fluid communication through grated openings with the second volume 4054, if the liquid or transport fluid rises in the second volume 4054 of the receiving hopper 4050, the weir or overflow channel may receive any overflow where the liquid may be provided to another location as desired. This may provide additional operating and control flexibility for the operation of the system 4000. Thus, if water or transport liquid in the second volume 4054 of the receiving hopper 4050 rises to the top, the water or transport liquid will be directed, in one embodiment, via grated openings to the weir or overflow channel so that the water may be piped or transported to a desired location.

Referring again to FIG. 1, the input material 4016 and the transport liquid are provided, in the embodiment shown, at the receiving hopper output 4056 at or adjacent the bottom of the receiving hopper 4050, where a pump, such as a jet pump 4022, may be used, in one implementation to inject or combine a liquid, such as the liquid 4014 from the recirculating system 4002 using the pipe 4018, with the input, material 4016. This liquid assists in fluidizing or in creating a more desirable slurry for processing the input material. In other embodiments, the liquid or fluid provided to the jet pump 4022 may be provided from any available and/or desired source, and this liquid may serve as the transport fluid that was previously described as being provided at the second volume 4054 of the receiving hopper 4050. In one embodiment, the jet pump 4022 may provide a pumping capacity up to around 180 gallons per minute.

A solids adjustment valve 4058, in one embodiment, receives the slurry that includes at least the transport fluid and the input material. Depending on the consistency and solids makeup/characteristics of the slurry, the solids adjustment valve 4058 may be used to throttle or control the flow of the slurry at this point in the system/process. In an implementation of the system 4000 in which drill cuttings are being processed, the solids characteristics may vary greatly from one bore hole to another, and even from one zone depth in the same bore hole to another zone depth. The solids adjustment valve 4058 provides a mechanism, to provide greater control and consistency, and the capability to work with a much wider range and variability of solids in the slurry.

At or adjacent the bottom of the receiving hopper 4050 where the first volume 4052 and the second volume 4054 come together and provide a receiving hopper output 4056, in one implementation, an upstream flow line extends adjacent or through the receiving hopper output 4056 and the solids adjustment valve 4058 may be positioned opposite an adjacent side (or downstream side) of the receiving hopper output 4056. The output of the jet pump 4022 is in fluid communication with the upstream flow line just mentioned and as illustrated in FIG. 1. Following the solids adjustment valve 4058, in one implementation, is a flow line with an injection port 4060 that is positioned prior to or adjacent an input to a mining pump 4062, which is also provided at or adjacent the receiving hopper output 4056 of the receiving hopper 4050.

Referring back to FIG. 1, the fluidized stream or slurry flows from the receiving hopper output 4056 through the solids adjustment valve 4058, and then to the mining pump 4062. The slurry includes at least the input material (with, for example, the solids of the drill cuttings) and, in certain embodiments, the transport liquid, such as water. The injection port 4060 is provided, in certain implementations, prior to or adjacent the input to the mining pump. The injection port 4060 may allow for the addition of desired chemicals and substances to assist the system in the separating and processing of the slurry and solids. Just as the solids adjustment valve provides greater flexibility in handling solids of different sizes and characteristics, the chemicals injected into the slurry via the injection port also provides enhanced processing if and when needed. For example, the chemistry of drilling fluids may vary significantly from operator to operator, region to region, and/or formation to formation. As such, certain chemicals, such as, for example, additional surfactants and soaps in the drilling fluids may cause serious processing issues. The injection of a polymer, coalescing agent and/or flocculating agent into the slurry at the injection port 4060 may significantly reduce such issues. Such chemicals, i.e., the polymer, coalescing agent and/or flocculating agent, may bond with the solids in the conveyable slurry.

The mining pump 4062 receives the conveyable slurry and provides the output to a separator 4064, such as dual hydrocyclones 4064. Each hydrocyclone of the dual hydrocyclone 4064, in one embodiment, includes an input where the conveyable slurry is received, and an upper output where liquids are separated, and a lower output that includes solids. The separator separates the conveyable slurry between at least a portion of the transport liquid, when present or applicable, and at least a portion of the input material. The at least a portion of the transport liquid is provided at the upper output, while the at least a portion of the input material, including solids, such as drill cuttings if applicable, are provided at the lower output of the separator 4064, which may be implemented in one embodiment using one or more hydrocyclones.

The transport liquid, which preferably is water, is provided at the upper output of the dual hydrocyclone 4064 to a transport liquid return pipe 4066 where the transport liquid may be provided, or transported where desired. In FIG. 1, the transport liquid is shown, being provided back to the second volume 4054 of the receiving hopper 4050, but it should be understood that such transport liquid or water may be provided to any desired location. The at least a portion of the input material 4016, which includes at least a portion of the drill cuttings and the drilling fluids, is provided at the lower output, which may be referred to as a separator output 4068 of FIG. 1, of the separator 4064, which may be implemented as the dual hydrocyclones. The at least a portion of the input material is provided to a filter 4070.

Figure 7A:
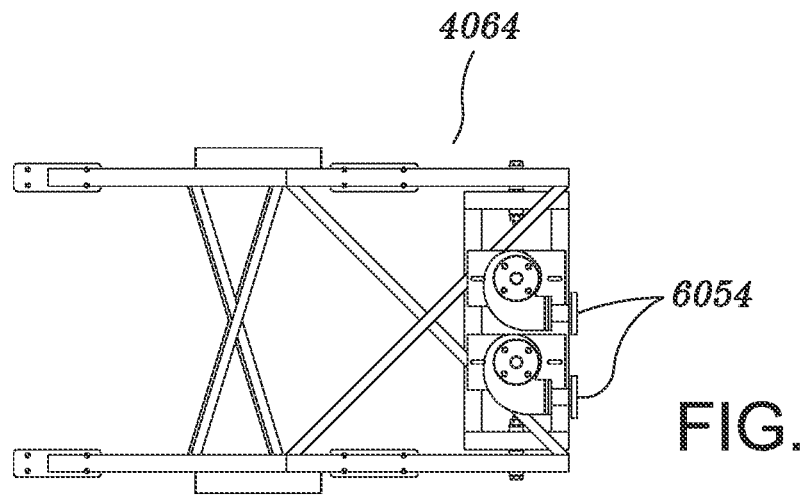
FIG. 7A is a top-view, line drawing of one embodiment of a separator implemented as a dual hydrocyclone.
Figure 7B:
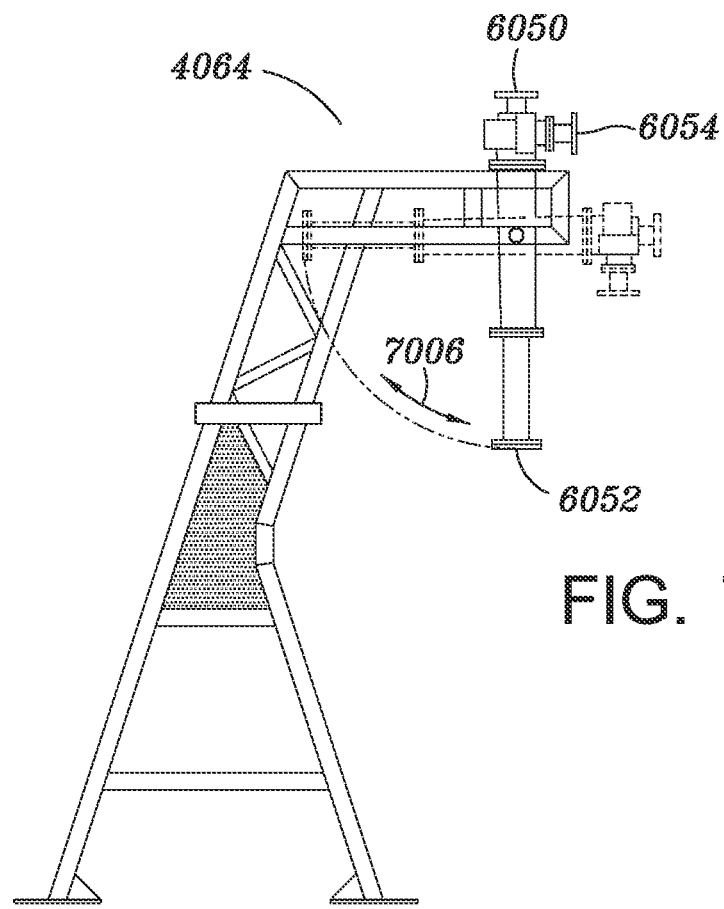
FIG. 7B is a side-view, line drawing of the hydrocyclones of FIG. 7A illustrating that such devices, in one implementation, may include rotatable supports so that each of the hydrocyclones may be rotated from one position to another, such as from a vertical position when in operation to a non-vertical position when being transported.

In operation, the dual hydrocyclones 4064 operate with their longitudinal axis in a generally vertical position, so that gravity allows the solids to drop out of the bottom output of the hydrocyclones as designed. The present disclosure provides for the rotational movement of the dual hydrocyclones when not in operation to allow such to be much more easily transported. In a preferred embodiment, the hydrocyclones are rotated so that their longitudinal axis are in a much more flat or horizontal orientation with respect to the ground when being transported, when compared to their vertical or near vertical orientation while in operation. Thus, the hydrocyclones do not extend substantially above the top of the system 4000 when being transported as part of the skid mounted, transportable system 4000. This may be required to allow passage under highway or roadway underpasses and bridges. FIGS. 7A and 7B provides a line drawing that illustrates a dual hydrocyclone 4064 with rotatable supports or mounts such that the dual hydrocyclones may be positioned during operation in a generally vertical position, and rotated to a generally horizontal position during transit or as desired, according to one implementation.

In certain implementations, high angle, dual hydrocyclones may be used that operate from about 6 to 50 psi, and that each can receive up to 98 gallons or so a minute. Each of the one or more hydrocyclones may separate the larger solids in the conveyable slurry from liquids and smaller particulates or smaller solids. In one embodiment, the one or more hydrocyclones can handle up to 25 to 30 percent, solids in the conveyable (or fluidized) slurry. The larger solids provided at the bottom outputs, along with some liquid that may coat or surround such solids, may be filtered or screened as discussed below.

In other embodiments, the separator 4064 may be implemented as one or more of the following: a high G hydrocyclone, a multi-stage hydrocyclone, a TURBOCLONE, a screw press, a belt press, and/or a rotary fan press to provide or assist with, dewatering the slurry. The rotary fan press may be one offered by Prime Solution Inc. and used to separate the conveyable slurry between at least a portion of the transport liquid, which may be referred to as a filtrate, and at least a portion of the input material. In one implementation this may replace the hydrocyclones that are shown and illustrated herein.

In one implementation, the dual hydrocyclones 4064 are positioned above a filter, which is implemented as a vibratory screen 4070, according to one implementation. Dual bottom outputs may serve as the separator output 4068 and provided above the vibratory screen.

Assuming that the transport liquid is water, in certain embodiments it is desirable to produce water that is clean or pure water or that meets a certain standard or quality. In the event salt is present in the water, the water may be provided to a desalination system or module to remove some or ail of the undesired salt. One solution includes the use of an ion-exchange member or resin bead that removes salt ions. In one implementation, the ion-exchange resin bead may be reused or regenerated using a hot water process to remove the captured salt ions from the material so that it then can be used to capture additional salt ions. One such desalination technique is referred to as Sirotherm desalination.

The portion of the input material that includes solids is provided from the separator 4064 to the filter 4070, which is shown implemented as a vibratory screen 4070 that may include a gyroscopically oscillating vibratory screen, such as one manufactured by Midwestern Industries, Inc. The smaller solids with liquids received at the vibratory screen 4070 of the input material are filtered through a screen of a desired or specified size such, that the larger solids, which in one embodiment will comprise primarily drill cuttings, will not pass through the vibrating screen, and will remain on top of the vibrating screen until moved or pushed to a channel or outer ridge that surrounds the outer perimeter of the screen. The portion of the input material that filters through the vibratory screen is provided at an output of the vibratory screen 4070 and will consist, in one embodiment, of smaller solids/particulates along with liquids, such as drilling fluids.

These smaller solids/particulates and accompanying liquid material are provided, in one implementation, to a pump 4080, which in one implementation is a positive displacement pump capable of pumping fluids and materials of greatly varying densities and characteristics. For example, Penn Valley Pump Company offers a DOUBLE DISC™ PUMPS by Inc., which may be considered a positive displacement pump, that may be used in one implementation to pump a slurry or fluid that contains drilling fluids (liquids) and some solids, such as that resulting from using the vibrating screen to provide drilling fluids and smaller solids or particulates, and to handle slurries or fluids of varying or changing solids content and consistency. The pump 4080 may provide these smaller solids/particulates and accompanying liquid material, which may include drilling fluid with particulate as listed in block 4082, to any desired location, such as, for example, to a third party site for further processing, or back to a drill site for reuse and/or recycling of the drilling fluids and constituents thereof.

Regarding the larger solids, which include at least a portion of the solids 4076, the perimeter channel of the vibratory screen 4070 directs all such "larger" solids to an output, such as the larger solids output 4072 of FIG. 1. These solids are provided to a conveyer, such as a conveyor 4074.

The conveyor 4074 receives solids from, the larger solids output 4072 of the vibratory screen 4070. The conveyor 4074, which may be implemented using any of a variety of conveyors, such as, for example, a screw or an auger conveyor, or even a belt conveyor, is powered by a conveyor motor 4088. The conveyor 4074 is preferably angled upwardly at a desired, angle from horizontal to transport the solids, and, in certain implementations, to dewater the solids as they are transported. The desired angle may be, in one implementation, at an angle greater than 25 degrees from horizontal, and, in another implementation, around 30 degrees above or from horizontal. The angled conveyor 4074 may use gravity to assist with further dewatering the solids, and may use a screen to allow the water to flow to a desired location away from the solids 4076. The solids 4076 are then dropped, dumped or provided from an output of the conveyor 4074 to a solids hopper 4078.

Figure 10B:
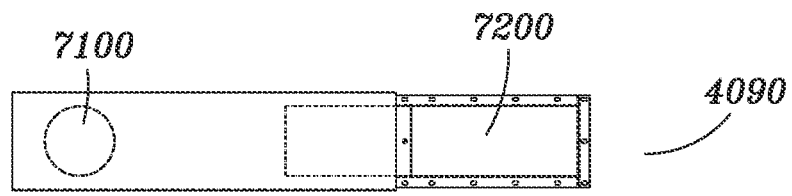
FIGS. 10A-10B is a side-view, line drawing that illustrates the solids conveyor as a screw conveyor according to one embodiment.
Figure 10A:
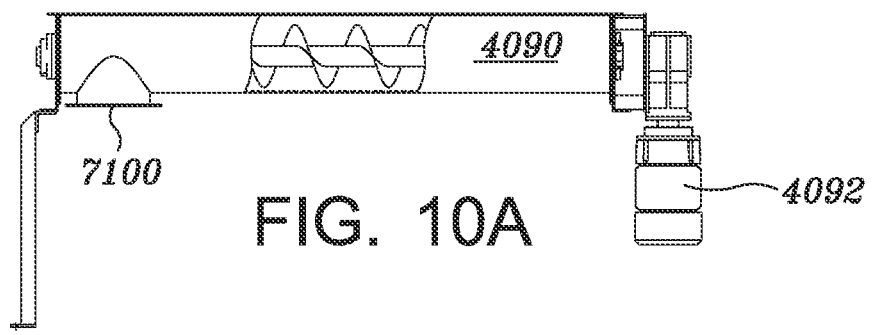

In one implementation, the system 4000 includes a solids level detector, such as an ultrasonic detector, which may be grouped or included as part of the control system 4500, that detects whether the level of solids 4076 in the solids hopper 4078 reaches a specified or certain level. The control system 4500 may, in response, start a solids conveyor 4090 through a solids conveyor motor 4092 to transport, solids 4076 from the bottom output of the solids hopper 4078. The solids 4076 may be transported to the opposite end of the solids conveyor 4090 where such solids are dropped into a mixing conveyor 4100. Both solids conveyor 4090 and mixing conveyor 4100 may be implemented using any of a variety of known or available conveyor systems, such as those described above in connection with the conveyor 4074. FIGS. 10A and 10B provide a view of one implementation of the solids conveyor 4090 and the solids conveyor motor 4092, and the interface where the solids 4076 may be dumped or provided from the output of the solids conveyor 4090 to the input of the mixing conveyor 4100, which may be powered by the mixing conveyor motor 4094.

In another implementation, the system 4000 includes a detector that determines the position of the solids in the solids conveyor 4090 or those that are at or near the input of the mixing conveyor 4100. This may be implemented using any number of detectors or sensors, such as an infrared detector, which may be grouped or included as part of the control system 4500, that detects the position of such solids. When a specific solids position is detected, in one implementation, a drying agent 4096 provided in a drying agent hopper 4098 is released upstream or adjacent the solids in or adjacent the mixing conveyor 4100. This allows the solids, which may include drill cuttings that are or contain hazardous chemicals, to be mixed, coated and/or covered with the drying agent to reduce, neutralize or eliminate any hazardous chemical concerns. This combination may be referred to as the coated output solids. This mixing of the drying agent 4096 and the solids can occur as the solids and drying agent (s) 4096 are mixed and transported by the mixing conveyor 4100.

The drying agent may include any known or available drying agent that, when mixed with the particular solids of an implementation, provides the desired neutralizing or chemical effects. Preferably, the drying agent or agents 4096 used to mix, coat and/or cover the solids of drill cuttings may include, but are not limited to, fly ash, cement, sand, pulp, cellulose, quicklime, and saw dust. In some implementations, these drying agents may foe combined.

Finally, a mixing conveyor output 4110 of the mixing conveyor 4100 is provided, to a rot at able output conveyor 4112, which may be implemented as a screw or auger conveyor. Solids mixed with at least one drying agent move from the mixing conveyor output 4110 to the rotatable output conveyor 4112. The rotatable output conveyor 4112 may be driven by a rotatable output conveyor motor 4116, and has a rotatable/ moveable output 4114. The rotatable/moveable output 4114 of the rotatable output conveyor motor 4116 allows the user to precisely position where the coated output solids of the system 4000 will be located, such as in the back of a truck or otherwise.

Figure 2:
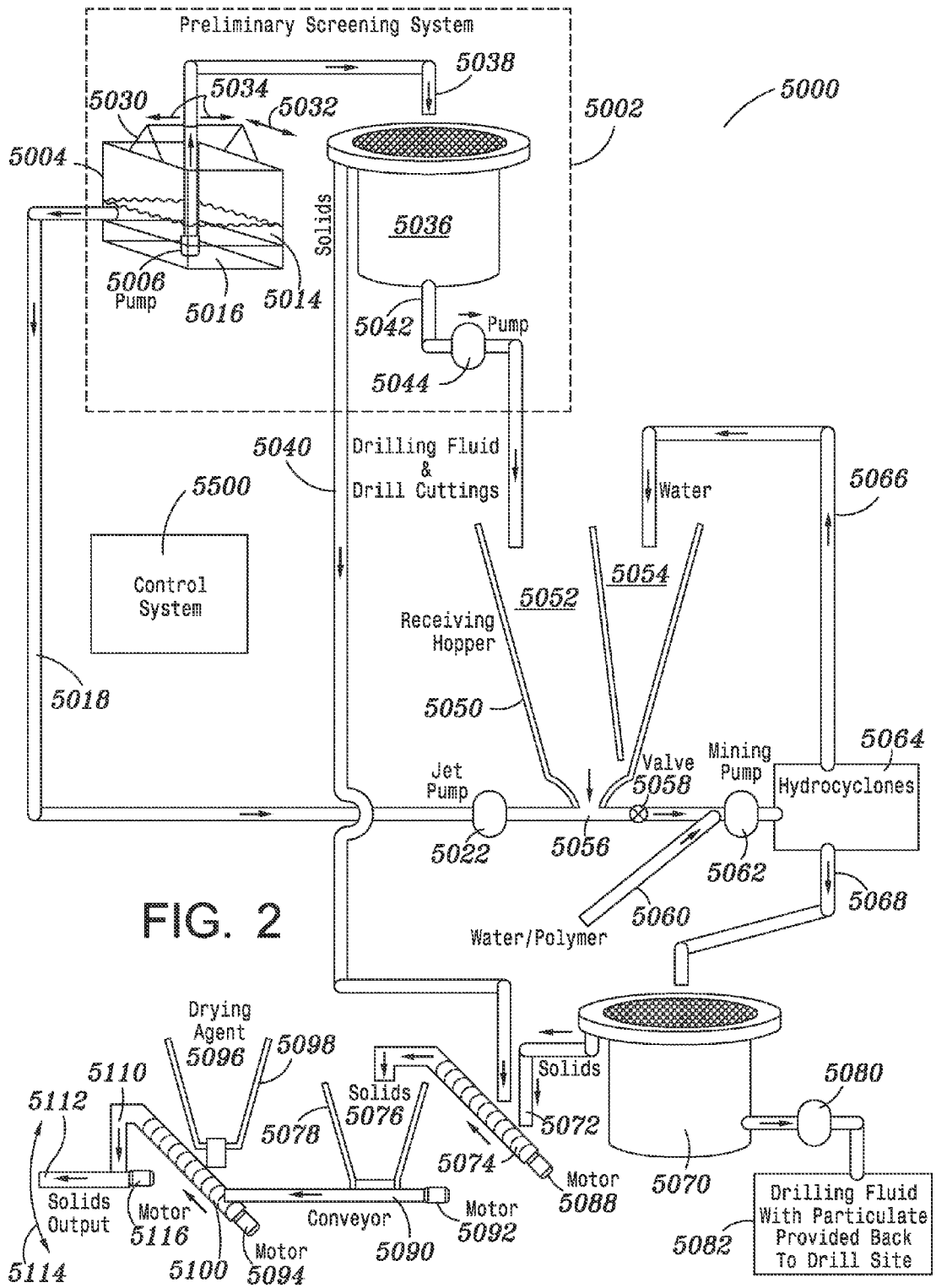
FIG. 2 is an overview diagram, of a system for separating drill cuttings from drilling fluids, and processing the separated drill cuttings according to another implementation that includes a preliminary screening system with a vibrating screen to preprocess the combination of drill cuttings and drilling fluids as well as a gantry system.

FIG. 2 is an overview diagram of a system 5000 for separating drill cuttings from drilling fluids, and processing the separated drill cuttings according to another implementation that includes a preliminary screening system 5002 that includes a filter 5036 implemented as a vibrating screen, to preprocess the combination of drill cuttings and drilling fluids, as well as a gantry system 5030 to provide movement in three dimensions to efficiently receive and remove the input material from the storage container 5004. The gantry system 5030 is discussed more fully in connection with FIGS. 15-21.

The description above regarding the system and elements of FIG. 1 also applies to FIG. 2 except for the substitution of the preliminary screening system 5002 for the recirculating system 4002. Thus, the description below applies only to the differences between the system 4000 in FIG. 1 and the system 5000 of FIG. 2, otherwise the description above accompanying FIG. 1 applies to each element of FIG. 2 except that the identical or same numbered items in FIG. 2 has increased by "1000" but are otherwise the same or similar.

The preliminary screening system 5002 of the system 5000 may be used to preprocess the input material 5016 to remove, for example, drill cutting solids that are too large. These larger or preprocessed solids may be introduced back into the system 5000 through the larger solids output 5040 of the filter 5036 through a port or pipe as shown in FIG. 2. This places the larger solids at a location in the system 5000 to eliminate, minimize or reduce the problems, such as clogged, or slowed processing times, caused by the larger solids clogging or slowing the system 5000.

The preprocessing can be achieved using the filter 5036 implemented as a vibratory screen 5036, which may be implemented the same as or similar to the vibratory screen 4070 of FIG. 1 and the vibratory screen 5070 of FIG. 2. Thus, a moveable pump 5006, which is moveable via the gantry system 5030, is used to provide the input material 5016, which may include drill cuttings and drilling fluids in certain implementations, from the storage container 5004 to the input screen of the vibratory screen 5036 using an input material pipe 5038 as shown in FIG. 2. The larger solids do not pass through the input screen and, are provided to the system 5000 at or adjacent the solids from, the vibratory screen 5070 via the larger solids output 5040 to the conveyor 5074. The smaller solids/particulates and liquids, such as drilling fluids, pass through the bottom, output of the vibratory screen 5036 at a smaller solids output 5042 and are pumped to the receiving hopper 5050 via a pump 5044 as input material to the system 5000. The input material may already contain one or more transport liquids.

The storage container 5004 includes the input material 5016 and a liquid 5014, such as that shown and described in connection with FIG. 1. The liquid 5014 may be pumped or directed via a pipe 5018 to system 5000 or elsewhere as desired. In a preferred embodiment, the storage container 5004 is implemented as a half-round storage tank.

A gantry system 5030 is shown positioned primarily above the storage container 5004 to allow increased ease of accessing the input material, which may include drill cuttings and drilling fluids, which will generally reside below the liquid 5014. As illustrated, the gantry system 5030 resides on the upper edge of the storage container 5004 and is moveable and/or reliable so that the moveable pump 5006 can be positioned as desired to access the input material. In a preferred embodiment, the gantry system 5030 includes wheels, casters or rollers that allow the gantry to move along the edges or rails as designated by the arrows associated with, the rail slidable gantry system 5032. The gantry system 5030 also provides positioning of the moveable pump 5006 in a direction 90 degrees from the rails (i.e., the direction described in the just prior sentence) as designated by the arrows associated, with the side-to-side gantry system 5034. In other embodiments, the moveable pump 5006 may be hoisted up and down to reach desired depths within the storage container 5004.

It should be noted that the gantry system 5030 could be used with the storage container 4004 in the recirculating system 4002 of the system 4000 of FIG. 1.

Various example implementations of the gantry system 5030 are illustrated in connection with FIGS. 15-20 below. These provide a gantry system positioned above a storage container that provides three-dimensional movement of the moveable pump 5006 using controls that can be operated by one person positioned on one side of the storage container.

Figure 3:
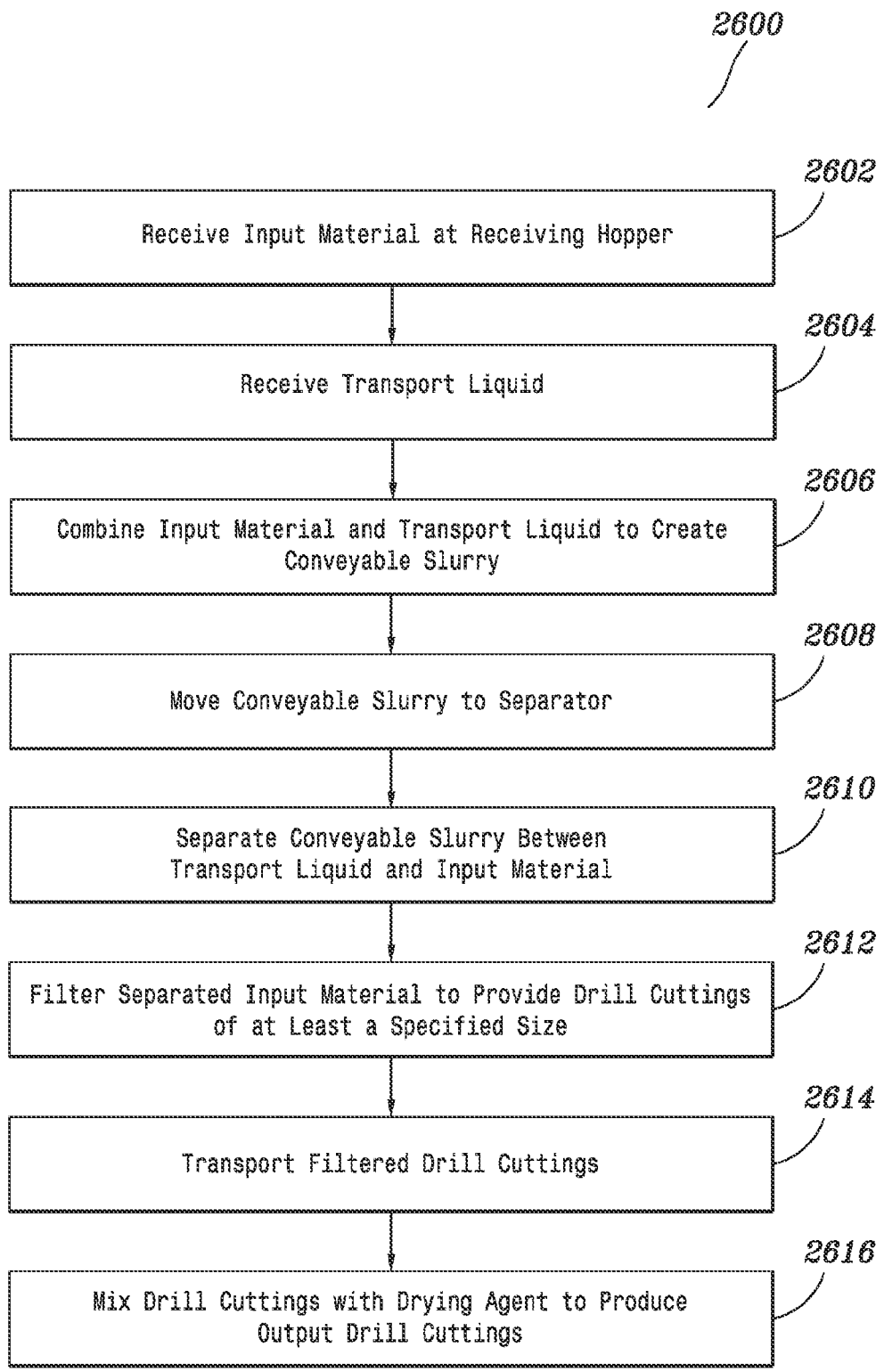
FIG. 3 is a flowchart of a method for separating at least a portion of the drill cuttings from a combination that includes both drill cuttings and drilling fluids, and for processing such separated drill cuttings.

FIG. 3 is a flowchart of a method 2600 for separating at least a portion of the drill cuttings from a combination that includes both, drill cuttings and drilling fluids, and for processing such separated drill cuttings. Generally, the method 2600 includes receiving the input material that includes drill cuttings solids and drilling fluids. In one implementation, the input material may include the addition of one or more oxidizing agents, such as a water soluble oxidizing agents, that include, for example, hydrogen peroxide, potassium, permanganate, a soap or a surfactant. Potassium permanganate or hydrogen peroxide, are examples of water soluble oxidizing agents. These agents may be added to the input material, in certain embodiments, at the half-round, preferably when the input material first leaves the half-round, or first enters the system, such as the system 4000 and 5000. In other embodiments, the method 2600 may include introducing the oxidizing agents at any convenient location where the drilling fluids are accessible.

The method 2600 includes receiving the input material at a receiving hopper in block 2602, and receiving a transport liquid, such as water, at or adjacent to the receiving hopper in block 2604. In one embodiment, the input material and transport liquid are combined or mixed, either at the receiving hopper or elsewhere to create a conveyable slurry in block 2606. In another embodiment, one or more liquids present in the input material serve as the transport liquid. The conveyable slurry is moved, preferably using a pump, to a separator in block 2608. As discussed above in connection with separator 4064 of FIG. 1, the separator may be implemented using one or more of the following: a hydrocyclone, a high G hydrocyclone, a multi-stage hydrocyclone, a TURBOCLONE, a screw press, a belt press, and/or a rotary fan press to provide or assist with dewatering the conveyable slurry.

The conveyable slurry is separated in block 2610 into a portion that includes at least solids, which will include at least some of the input material, and a portion that includes at least liquids, which will include at least some of the transport liquid. In a preferred embodiment, a larger portion of the transport liquid is provided in one of the portions.

The method 2600 proceeds to block 2612 where the at least a portion of the solids of the input material that are provided in block 2610 are filtered to provide solids of a desired or specified size. These solids may constitute drill cuttings. The filter may be implemented as a vibratory screen, in one embodiment. The drill cuttings, in block 2614, are transported, and mixed with one or more drying agents in block 2616 to produce output drill cuttings. The drying agents may include, for example, quicklime, fly ash, cement, sand, cellulose, pulp and saw dust, and the like.

FIG. 4 is a side-view, line drawing that illustrates a general arrangement of one embodiment of certain components of the system 4000 for separating drill cuttings from drilling fluids that is arranged and provided on a skid 6000 for ease of transportation on readily available commercial trailers for hauling cargo over highways. Referring back to FIG. 1, various components of the system 4000 are shown and labeled with reference numerals in FIG. 4. Input material may be received at the receiving hopper 4050 where transport liquid may also be provided. An output 6300 or the receiving hopper 4050 may be provided to drain or provide liquids, such as transport liquids, that fill or overflow from the receiving hopper 4050. This liquid may be provided to any location as desired.

The input material will include solids, such as drill cuttings and is provided as a conveyable slurry at the receiving hopper output 4056, where other fluids or liquids may be injected or combined, such as from the pipe 4018, if desired and as previously discussed above. The input material may be provided to the mining pump 4062 and provided to a separator, such as separator 4064 which may be implemented in one embodiment as a dual hydrocyclone. In operation, the separator or hydrocyclones 4064 are positioned in a vertical orientation, while during transport and not in operation, the separator or hydrocyclones 4064 are preferably positioned in a horizontal or non-vertical position to allow for lower height clearances when the system 4000 is being transported along roadways on a trailer using the skid 6000. The connection from the mining pump 4062 to the separator 4064 is not shown in FIG. 4.

The conveyable slurry with the input material (and drill cuttings in one embodiment) is received at an input 6054 of the separator 4064 and separated into liquids, which exit an upper output 6050, where the liquid, which may include water, may be piped to any desired location or even provided back to the receiving hopper 4050. The solids will be primarily provided at a lower output 6052 of the separator 4064, and provided to the filter 4070, which may be implemented using a vibratory screen, or any of the other items previously discussed.

The larger solids, such as drill cuttings, will be provided from the filter 4070, such as from the top of the vibratory filter screen, and provided, to an input 6010 of the angled conveyor 4074, where they are conveyed/moved using the motor 4088, and preferably further dewatered and deposited into the solids hopper 4078. The conveyor 4074 is preferably angled upwardly at a desired angle from horizontal to transport the solids. The desired angle may be, in one implementation, at an angle greater than 25 degrees from horizontal, and, in another implementation, around 30 degrees above or from horizontal. The solids are then dropped, dumped or provided from an output 6012 of the conveyor 4074 to the solids hopper 4076.

The solids are then provided at an output at or adjacent the bottom of the solids hopper 4078 to the solids conveyer 4090 (not shown in FIG. 4) powered by the motor 4092 to be transported to the mixing conveyor 4100 that is powered by motor 4094.

The control of the conveyors and motors may be done by any number of detectors, sensors and transducers to control the various motors, devices and components of the system 4000. For example, a detector may interface with a programmable controller to turn on/off the various motors, such as the motor 4992 and 4994 of the respective conveyors, such as screw conveyors, they rotate.

The drying agent hopper 4098 contains one or more drying agents that may be combined with the solids to neutralize or mix with the solids, which will still include some liquids, such as drilling fluids. A drying agent conveyor 6102, which was not expressly shown in FIGS. 1 and 2, but is shown in FIG. 4, may be powered by a motor 6100 and used to receive the drying agent, and provide it to the mixing conveyor 4100 to be mixed or combined with the solids.

The mixing conveyor 4100 may be angled and provided at a mixing conveyor output 7300. This may, in one embodiment, serve as the output of the system 4000, or may be provided to an input of the rotatable output conveyor 4112 that is powered by the rotatable output conveyor motor 4116. One portion, such as first end, of the rotatable output conveyor 4112 may be rotatably mounted using a rotatable mount 6200 so that the rotatable output conveyor 4112 may be laterally rotated so that the output material, such as drill cuttings combined with the drying agent, may be provided over a truck bed, storage container, or other location as desired. During transport of the system 4000, the rotatable output conveyor 4112 will be positioned in close proximity to the system 4000 so that it can be readily transported over highways using standard trucking equipment and trailers. The skid 6000 may include one or more rollers for use in assisting with moving and loading the system 4000 onto a trailer or where desired.

FIG. 5 is a top-view, line drawing of the system 4000 of FIG. 4 that illustrates an implementation of the system 4000 and certain components for separating drill cuttings from drilling fluids, and processing the separated drill cuttings. Several components not expressly visible in FIG. 4 include solids conveyor 4090, which is not labeled with a reference numeral, but can be seen, extending from the solids hopper 4078 to the mixing conveyor 4100 alongside the mixing conveyor motor 4094, along with the drying agent conveyor 6102. Further both of the dual hydrocyclones 4064 can be seen from the top view of FIG. 5.

FIG. 6A is a top-view, line drawing of one embodiment of the receiving hopper 4050 that may be implemented in one embodiment. The receiving hopper includes the first volume 4052 for receiving input material, such as drilling fluids and drill cuttings, and the second volume 4054, which may receive water, a transport liquid, such as water or one or more drilling fluids. A divider wall 6306 separates the volumes, and the two volumes may come together at the bottom of the divider wall 6306, which can be seen more clearly in FIG. 6B.

An upper overflow channel 6302 may be provided with one or more openings, such as grated openings 6304, to the top of the second volume 4054. Thus if the water or transport liquid in the second volume 4054 rises too high, it will flow through the grated opening 6304 to the overflow channel 6302 and then through an output 6300 where it may be provided to any desired location within or outside of the system 4000.

FIG. 6B is a side-view, partial-cutaway, line drawing of the receiving hopper 4050 of FIG. 6A, along with the receiving hopper output 4056 shown at the bottom where the two volumes of the receiving hopper 4056 come together below the bottom of the divider wall 6306. The grated, openings 6304 are also illustrated.

FIGS. 7A and 7B are a top-view and a side-view, respectively, of line drawings of one embodiment of a separator 4064 implemented as a dual hydrocyclone. Such dual hydrocyclones include the inputs 6054, the upper outputs 6050, and the lower outputs 6052. In one implementation, rotatable supports are provided so that each of the hydrocyclones may be rotated from one position to another, such as from a vertical position when in operation to a non-vertical position when being transported. The arrow 7006 represents the direction of rotation that may be implemented from and between horizontal positions (or non-vertical positions) and vertical positions.

FIGS. 8A-8B is a side-view and top-view, line drawing that illustrates the angled conveyor 4074 implemented using as a screw conveyor according to one embodiment. The angled conveyor 4074 includes the input 6010 for receiving solids and the output 6012 for delivering or dropping the transported solids, and further dewatered solids, to the solids hopper 4078. As previously mentioned, the angle of the angled conveyor will assist with dewatering, as well as the speed of the rotation of the conveyor motor 4088, and hence the speed of the rotation of the screw or auger.

Figure 9:
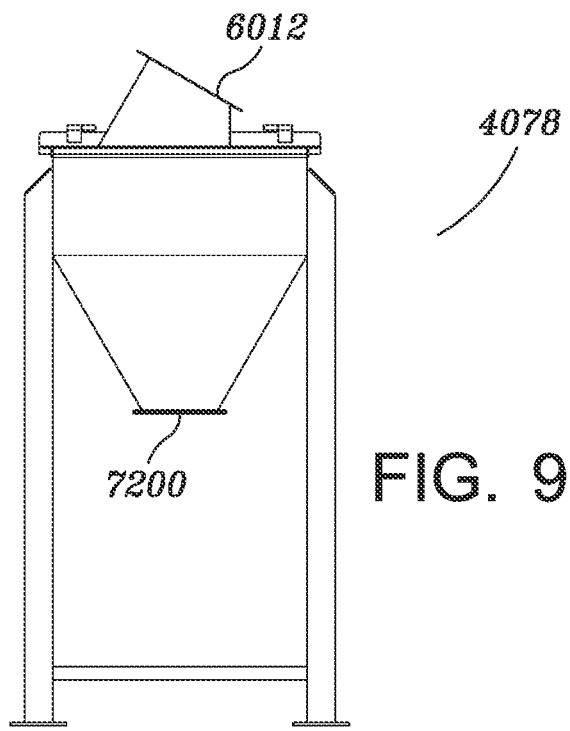
FIG. 9 is a line drawing that illustrates a solids hopper according to one embodiment.

FIG. 9 is a line drawing that illustrates a solids hopper 4078 according to one embodiment. Solids are received at an input from the output 6012 of the angled conveyor 4074, and are provided at a solids hopper output 7200 to the solids conveyor 4090.

FIGS. 10A-10B is a side-view and top-view line drawing that illustrates the solids conveyor 4090 as a screw conveyor according to one embodiment. Solids are received from the solids hopper output 7200 and provided to the mixing conveyor at the opening 7100.

Figure 11:
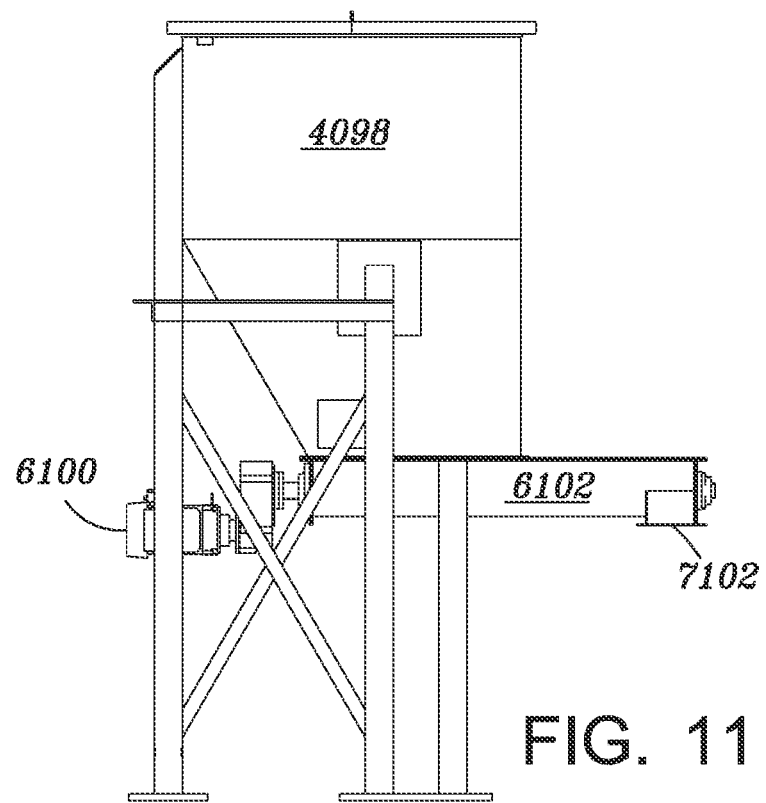
FIGS. 11 and 12A-12B is a side-view, line drawing that illustrates the drying agent hopper with the drying agent conveyor as a screw conveyor according to one embodiment.
Figure 12B:
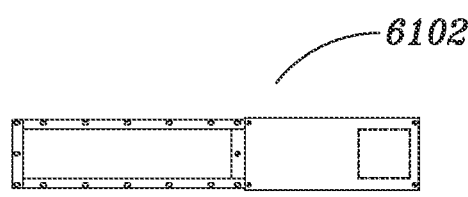
Figure 12A:
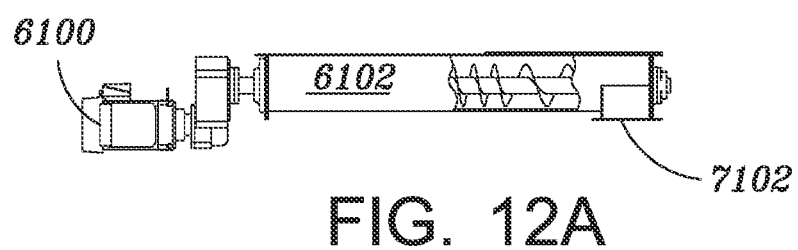

FIGS. 11 and 12A-12B is a side-view, line drawing that illustrates the drying agent hopper 4098 with the drying agent conveyor 6102 implemented as a screw conveyor according to one embodiment. The drying agent is provided in the drying agent hopper 4098 and is dispensed to the drying agent conveyor 6102 through an output opening adjacent the bottom of the drying agent hopper 4098. The drying agent conveyor 6102 transports or moves the drying agent to an opening 7102 to be provided to the mixing conveyor 4100. The motor 6100, in one implementation, is controlled and/or turned on/off by the control system 4500 or 5500 as discussed elsewhere.

FIGS. 13A-13B is a side-view, line drawing that illustrates the mixing conveyor 4100 as a screw conveyor according to one embodiment. Solids are received at the opening 7100 from the solids conveyor 4030, and the drying agent is received at the opening 7102 from the drying agent conveyor 6102. The solids and drying agent are mixed as they two substances are conveyed, preferably, but not solely, in an upward direction, toward the mixing conveyor output 7300, where the compound or drying agent/solids mixture is provided either as a final output of the system, or to the rotatable output conveyor 4112 so that the drying agent/solids mixture may be provided at a desired location.

Figure 14B:
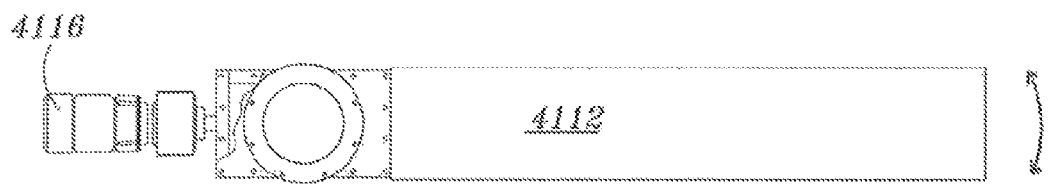
FIGS. 14A-14B is a side-view, line drawing that illustrates a rotatable output conveyor as a screw conveyor with a rotatable mount, swivel or hinge, according to one embodiment, that allows the rotatable output conveyor to "swing" or move laterally that may serve as the output of the system to provide treated or processed drill cuttings at a desired location.
Figure 14A:
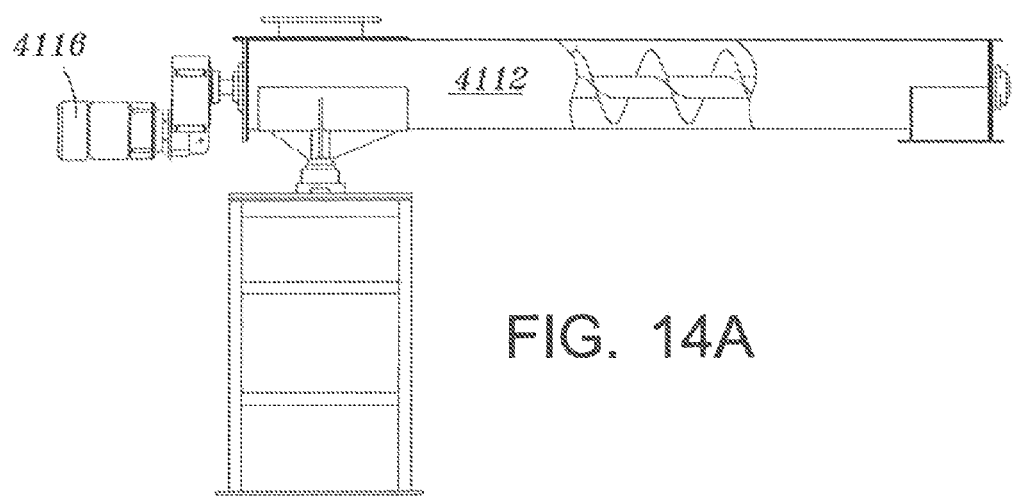
Figure 15:
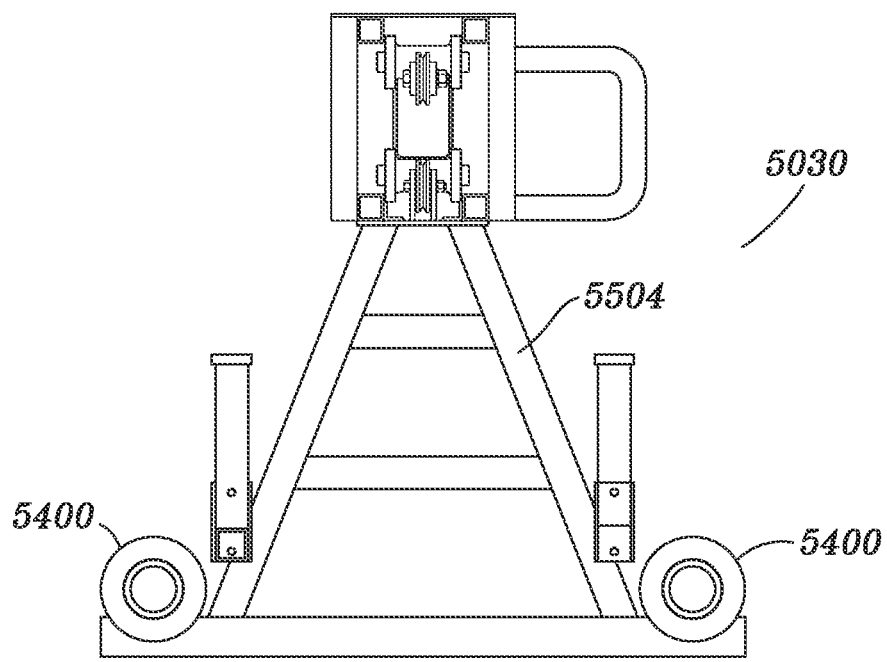
FIGS. 15-20 are simplified line drawings that illustrate various views of a gantry system for use in moving and controlling the position of a pump or receiving pipe in three dimensions within a storage tank, such as a storage tank that includes the input material of drill cuttings and drilling fluid being processed as illustrated in FIG. 2, according to one implementation.

FIGS. 14A-14B is a side-view, line drawing that illustrates a rotatable output conveyor as a screw conveyor with a rotatable mount, swivel or hinge, according to one embodiment, that allows the rotatable output conveyor to "swing" or move laterally that may serve as the output of the system to provide treated or processed drill cuttings at a desired location;

FIG. 15 is a line drawing that illustrates a side view of an implementation of the gantry system 5030, such as that shown and discussed in connection with FIG. 2. The gantry system 5030 includes one or more rollers 5400, such as two rollers on each of two sides of the gantry system 5300, that may reside on upper side rails of a storage container or other support member to position the gantry system 5030 relative to the storage container. Ultimately, the gantry system 5300 may be positioned at or above a storage container and is operable to lower and position a pump or receiving tube/pipe within the storage container, such as the storage container 4004, at a desired location so that the input material, which may contain drill cuttings and drilling fluids, may be received, and processed. The gantry system 5030 may be structurally supported through various structural members 5504.

Figure 16:
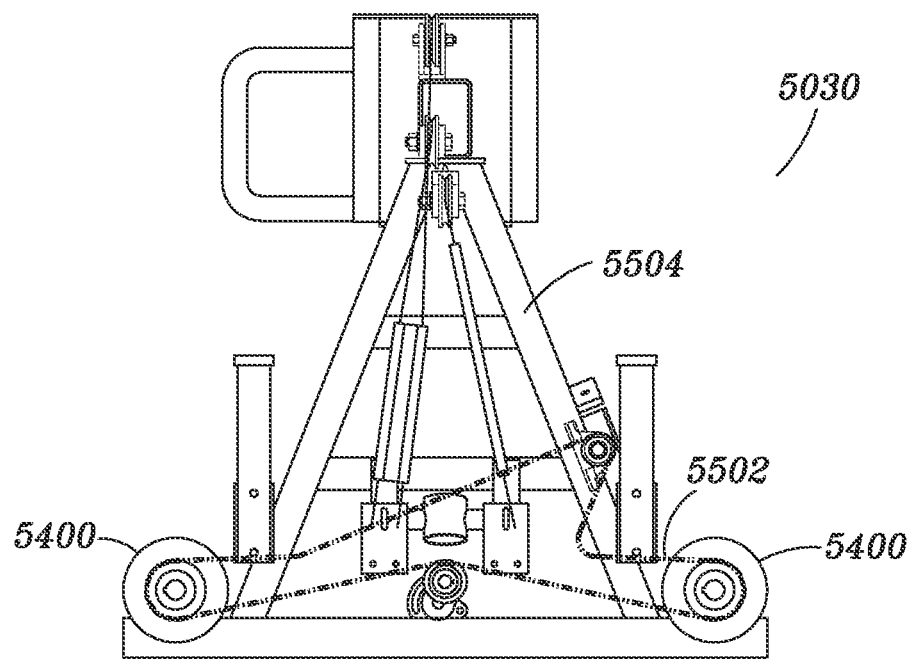

FIG. 16 is a simplified line drawing that illustrates an opposite side view of the gantry system 5030 of FIG. 15 showing various structural elements that demonstrate the operation of the gantry system 5030 for this implementation. A chain mechanism assembly is shown to roll the gantry system 5030 on side rails of a storage container using the rollers 5400. A chain, belt, or connecting assembly 5502 is shown on this side that couples around one or more sprockets or gears to drive the wheels or rollers 5400 when a handle/lever is rotated.

Figure 17:
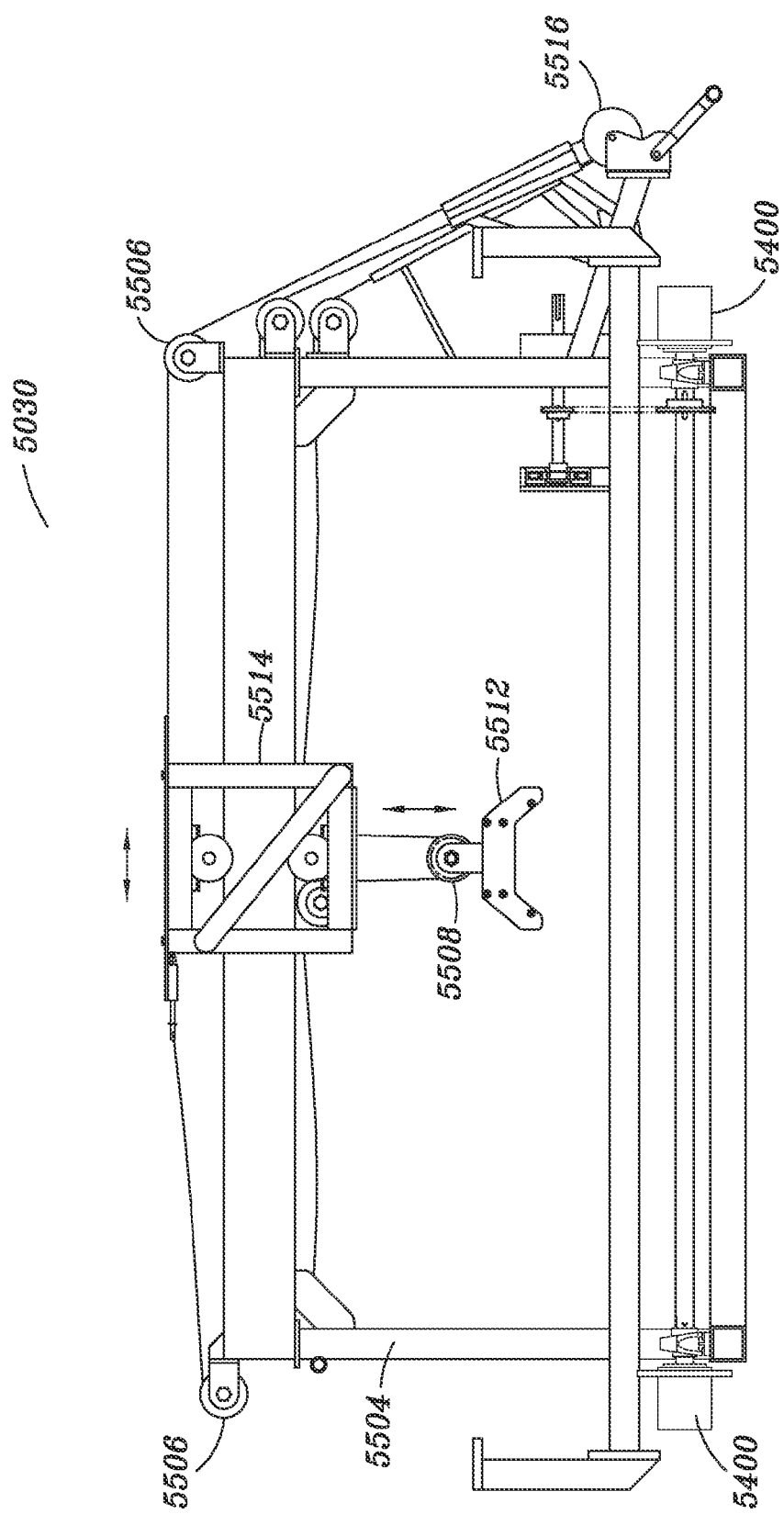

FIG. 17 is a line drawing that illustrates a back view of the gantry system 5030 that will reside above a storage tank, such as a half-round storage tank, with an assembly, such as a pump bracket 5512, operable to connect to a pump or receiving pipe that is shown to be movable in an upward and downward direction using an up and down pulley system 5508, as well as a moveable frame 5514 that moves the assembly or pump bracket 5512 in a left and right direction as viewed in FIG. 17 using a left and right, pulley system 5506. Thus, the assembly or pump bracket may be positioned over a storage container and positioned at any location in the storage container by positioning up/down, left/right (as just described), and into and out of the page using the rollers 5400 and supporting assembly as previously discussed. Thus, the gantry system 5030 may be used to position a pump or receiving pipe in three dimensions within a storage container to effectively and efficiently receive and process input material.

A structure using various structural members 5504 is shown supporting the various components of the gantry system 5030 in this implementation.

Figure 18:
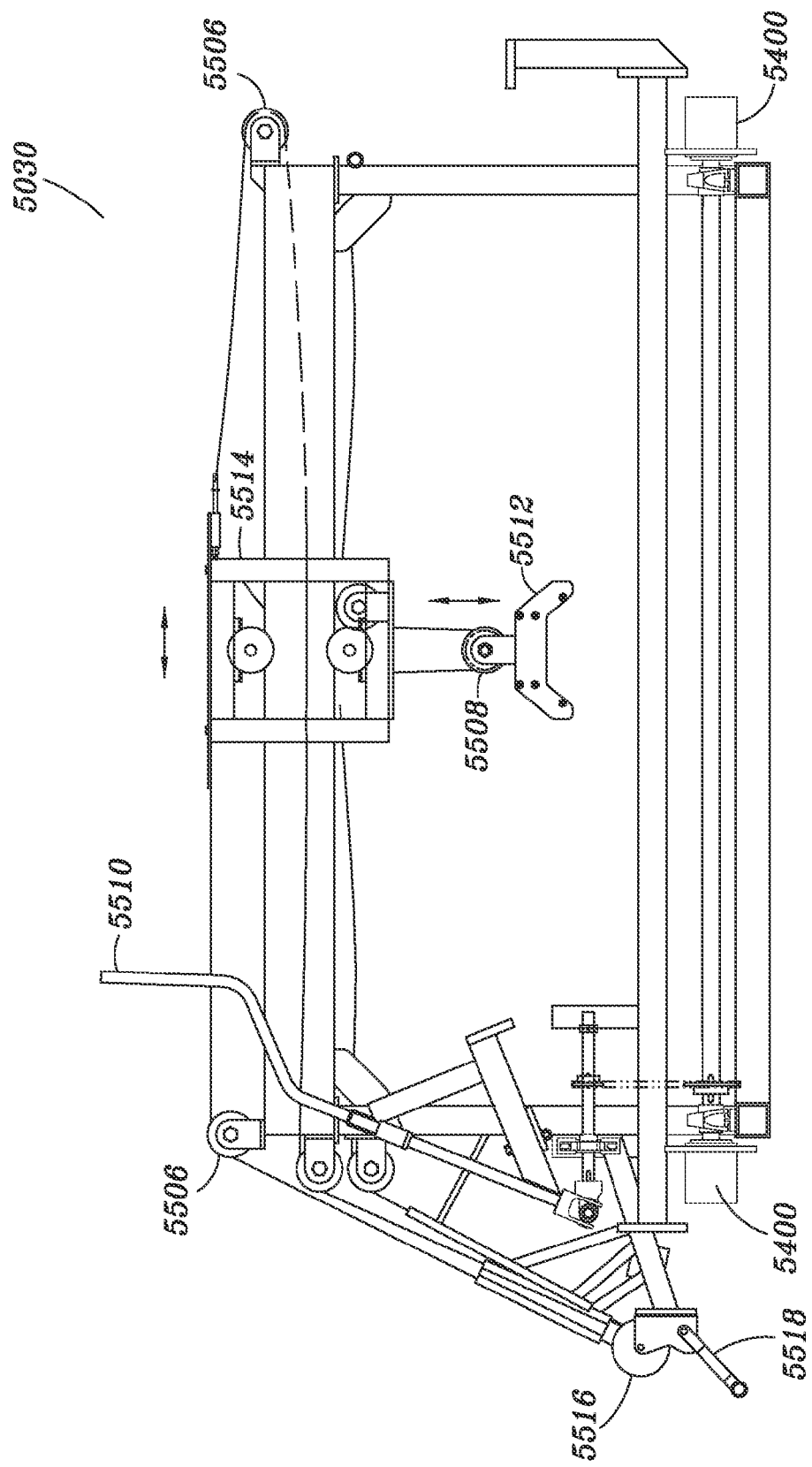

FIG. 18 is a line drawing that illustrates a front view of one implementation of the gantry system 5030 that is opposite the view of FIG. 17, and that includes pulleys and certain levers (not necessarily shown in other FIGURES) so that the three dimensional movement of the gantry system 5030 may be controlled at one location along the left side as shown in FIG. 18, with the two-dimensions of movement visible in FIG. 18 indicated by the up and down arrows, and the left and right arrows.

The user standing to the left would use one or more levers and/or handles to control the use and positioning of the gantry system 5030. For example, a rolling lever 5510 is shown that may be folded or angled towards a user on the left, and that may be rotated to engage the chain/belt mechanism to roll the gantry system 5030 along rails or edges using the rollers 5400. One or more lever/ratchet arrangements may be used, such as one or more 2-way hand wenches with a brake 5516/5518, to control the left and right pulley system 5506 and up and down pulley system 5508 so that the assembly or pump bracket 5512 may be positioned left and right, and up and down, respectively.

FIG. 19 is a line drawing that illustrates a side view of the gantry system 5030, like that of FIG. 16, in operation and positioned above the storage tank 5004, which is implemented as a half-round storage tank, and operable to move left and right using chain or linkage driven rollers 5400 along upper edges of the storage tank 5004, such as a first side rail 5600. When the lever or member mechanically coupled to the chain linkage is rotated in one direction or the other, the gantry system moves left or right using the rollers 5400 moving on one side along the first side rail 5600, while other rollers 5400 are positioned on a second side rail 5602 (not shown in FIG. 19) and move accordingly.

FIG. 20 is a line drawing that illustrates a front view of the gantry system 5030, like that of FIG. 18, in operation and positioned above the storage tank 5004 and operable to move in three dimensions to position either a pump or receiving pipe in the storage tank, and that, in this embodiment, may be operated by one person positioned along the left side of the gantry system 5030 as shown in this FIG. 20. The rollers 5004 are shown positioned, and reliable on or along the first side rail 5600 and the second side rail 5602.

Figure 21:
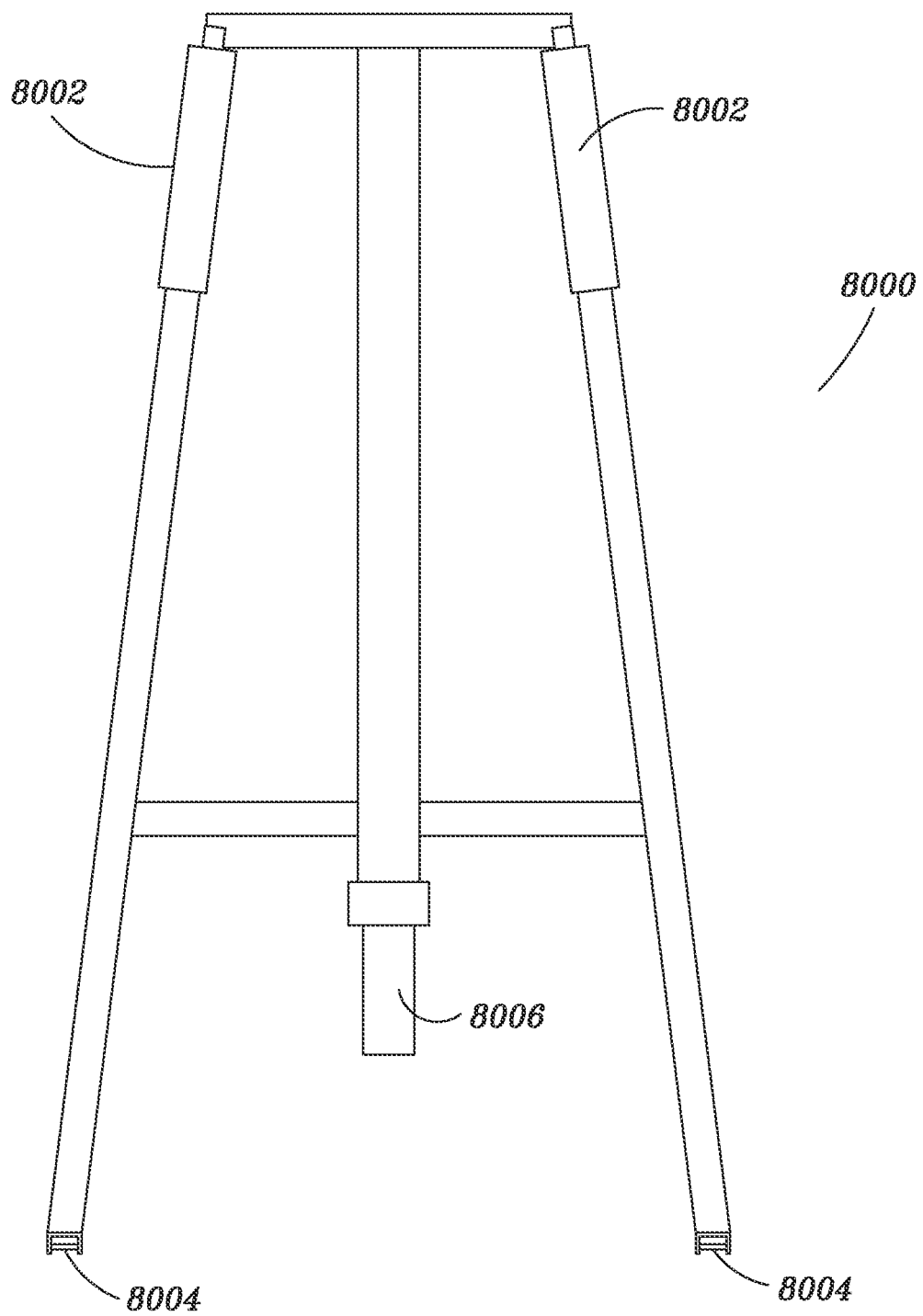
FIG. 21 is a line drawing that illustrates a top view of a liquid receiving mechanism that may include one or more floats positioned on one or more support members that may be hingably mounted to a storage tank, such, as on or adjacent a top rail of the storage tank, such as a half-round storage container, so that the liquid receiving mechanism may move up or down, to access liquid in the storage tank. The one or more floats allow an opening of a liquid receiving pipe to remain positioned to access liquid at or near the top of the liquid level provided in the storage tank or container. In one embodiment, the liquid is a liquid from drilling fluids and/or a transport liquid that resides above the input material in the storage container that may include drilling fluids and drill cuttings.

FIG. 21 is a line drawing that illustrates a top view of a liquid receiving mechanism 8000 that may include one or more floats 8002, which may be Styrofoam, a closed-cell foam, a polymer or any other material that provides floatation properties, positioned on one or more support members. The two support members 8004 of FIG. 21 are shown with a hingable connection on one end of each such support member 8004 so that the hingable ends may be mounted to a storage tank, such as on or adjacent a top rail of the storage tank, such as a half-round storage container, so that the liquid receiving mechanism 8000 may move up or down to access liquid in the storage tank. The one or more floats 8002 allow an opening of a liquid receiving pipe 8006, located adjacent the two floats 8002 in the liquid receiving pipe 8006 to remain positioned to access liquid at or near the top of the liquid level provided in the storage tank or container. In one embodiment, the liquid is a liquid from drilling fluids and/or a transport liquid that resides above the input material in the storage container that may include drilling fluids and drill cuttings.

The end of the liquid receiving pipe 8006 shown opposite the two floats 8002 in FIG. 21 may be connected to a tube, hose or pipe, such as the pipe 4018 of FIG. 1 or the pipe 5018 of FIG. 2, to receive or remove the liquid at the top of the storage container. As the liquid levels rise and fall, the opening of the liquid receiving pipe 8006 move up and down as the level of the liquid rises or fails so that the liquid in the storage container may continue to be received, removed, pumped, and/or recirculated as desired.

Thus, it is apparent that there has been provided, in accordance with, claims of the present invention, a system, and method, for separating two or more materials from one another, such as a solid from a liquid, a solid from a slurry, drill cuttings from drilling fluids, or gold solids from a slurry, for example. Although the preferred embodiment has been described in detail, it should be understood that various changes, substitutions, and alterations can be made herein without departing from the scope of the present invention, even if all of the advantages and benefits identified above are not present. For example, the various embodiments and examples shown in the drawings and descriptions provided herein illustrate that the present invention may be implemented and embodied in numerous different ways that still fall within the scope of the present invention, whether expressly shown herein or not. For example, the various elements or components may be combined or integrated in another system or certain features may not be implemented. Also, the techniques, systems, sub-systems, and methods described and illustrated in the preferred embodiment as discrete or separate may be combined or integrated with other systems, designs, techniques, or methods without departing from the scope of the present invention. For example, the functionality provided by the hydrocyclone may be provided by other separators or in combination with other functions. Other examples of changes, substitutions, and alterations are readily ascertainable by one skilled in the art and could be made without departing from the spirit and scope of the present invention.

What is claimed is:

1. A system for separating at least a portion of drill cuttings from a combination that includes both drill cuttings and drilling fluids, the system comprising:
    a receiving hopper operable to receive an input material, which includes at least the combination of drill cuttings with solids and drilling fluids, the receiving hopper operable to provide at least a portion of the input material at one or more output openings;
    a pump operable to pump a conveyable slurry that includes the combination of at least a portion of the input material and a transport liquid;
    a separator operable to receive the pumped conveyable slurry, and operable to separate the conveyable slurry between at least a portion of the transport liquid and at least a portion of the input material of the conveyable slurry;
    a filter operable to receive the at least a portion of the input material separated by the separator, and operable to separate such input material into at least a portion of the solids of the drill cuttings that are above a specified size, and into at least a portion of the drilling fluids and solids of the drill cuttings that are below the specified size;
    a solids hopper operable to receive the at least a portion of the solids of the drill cuttings that are above the specified size, and to dispense such solids at one or more output openings;
    a conveyor operable to receive the at least a portion of the solids of the drill cuttings that are above the specified size, and to transport such solids of the drill cuttings to the solids hopper; and
    a mixer operable to receive a drying agent and the solids of the drill cuttings provided from the solids hopper, and operable to mix the drying agent with the solids of the drill cuttings to produce output drill cuttings.

2. The system of claim 1, wherein the receiving hopper includes a first volume operable to receive the input material, and a second volume operable to receive the transport liquid.

3. The system of claim 2, wherein the receiving hopper includes a weir configured to provide a liquid communication path with a portion of the second volume of the receiving hopper, and wherein the transport liquid may flow through this liquid communication path.

4. The system of claim 3, wherein the weir is further configured to provide an output where the transport liquid may flow when the second volume is at or near a certain capacity.

5. The system of claim 2, wherein the receiving hopper includes a mixing volume operable to receive the input material from the first volume, and to receive the transport liquid from the second volume where the input material and the transport material may come in contact with one another prior to exiting at the one or more output openings.

6. The system of claim 1, wherein the system is mounted on a skid that may be loaded onto and transported via roadways on a flat-bed trailer.

7. The system of claim 1, wherein the conveyor is at least one from the group that includes a screw conveyor, a belt conveyor, and a rotating auger conveyor.

8. The system of claim 1, wherein the conveyor is provided at an angle not greater than around 30 degrees from horizontal.

9. The system of claim 1, wherein the conveyor is provided at an angle greater than around 25 degrees from horizontal.

10. The system of claim 1, wherein the conveyor used to transport the portion of the solids of the drill cuttings that are above the specified size is further operable to dewater such solids.

11. The system of claim 1, wherein one or more fluids in the drilling fluids serve as the transport liquid.

12. The system of claim 1, wherein the mixer is one or more from the group that includes a screw conveyor and a belt conveyor.

13. The system of claim 1, wherein the mixer is provided at an angle greater than around 25 degrees from horizontal.

14. The system of claim 1, further comprising:
a rotatable output conveyor operable to receive the output drill cuttings at a first end and to deliver the output drill cuttings at a second end of the rotatable output conveyor.

15. The system of claim 1, wherein the separator includes one or more from the group that includes a hydrocyclone, a high G hydrocyclone, a turboclone, a screw press, a belt press, and a rotary fan press.

16. The system of claim 1, wherein the separated portion of the transport liquid is provided back to the receiving hopper through a connection.

17. The system of claim 1, wherein the filter includes a screen with one or more sized openings so that the portion of the solids of the drill cuttings that are above the specified size do not pass through the screen.

18. The system of claim 1, wherein the filter is a vibrating screen.

19. The system of claim 1, wherein the filter is a gyroscopically vibrating screen.

20. The system of claim 1, further comprising:
a double disc pump operable to receive and pump the at least a portion of the drilling fluids and solids of the drill cuttings that are below the specified size from the filter.

21. The system of claim 1, further comprising:
a solids level detector operable to detect the level of solids in the solids hopper.

22. The system of claim 21, wherein the solids level detector is an ultrasonic detector.

23. The system of claim 21, further comprising:
a solids conveyor operable to receive solids from the solids hopper when the solids level detector detects a certain level of solids in the solids hopper.

24. The system of claim 1, further comprising:
a drying agent hopper operable to store the drying agent.

25. The system of claim 23, further comprising:
a drying agent hopper operable to store the drying agent.

26. The system of claim 25, further comprising:
a detector operable to detect the presence of solids, and to initiate the release of the drying agent from the drying agent hopper in response.

27. The system of claim 26, wherein the detector is an infrared detector.

28. The system of claim 1, wherein the drying agent includes one or more from the group that includes fly ash, cement, sand, pulp, cellulose, quicklime and saw dust.

29. The system of claim 1, further comprising:
a pump operable to receive the at least a portion of the drilling fluids and solids that are below the specified size to another location to be recycled for use as a drilling fluid.

30. The system of claim 29, wherein the pump is a double disc pump.

31. The system of claim 1, further comprising:
a solids adjustment valve operable to receive the conveyable slurry and adjust the flow of the conveyable slurry.

32. The system of claim 1, further comprising:
an injection port operable to receive a liquid to add to the conveyable slurry adjacent the pump.

33. The system of claim 1, further comprising:
an injection port operable to receive a coalescing agent to add to the conveyable slurry adjacent the pump.

34. The system of claim 1, further comprising:
an injection port operable to receive a polymer to add to the conveyable slurry adjacent the pump.

35. The system of claim 1, further comprising:
a storage tank operable to store the input material.

36. The system of claim 35, further comprising:
a gantry system positioned adjacent the storage tank, and operable to position an input material pump in certain locations of the storage tank.

37. The system of claim 36, wherein the gantry system is positioned substantially above the storage tank.

38. The system of claim 37, wherein the gantry system is rollably postionable, and is supported substantially above the storage tank using one or more upper portions of the storage tank.

39. The system of claim 35, wherein the storage tank is a half-round storage tank.

* * * * *